United States Patent [19]

Iijima et al.

[11] Patent Number: 5,787,343
[45] Date of Patent: Jul. 28, 1998

[54] METHOD OF PROCESSING CALLS BETWEEN MOBILE TERMINALS AND FIXED TERMINALS

[75] Inventors: Masami Iijima; Takaaki Kawakami, both of Kawasaki, Japan

[73] Assignee: Fujitsu Limited, Kanagawa, Japan

[21] Appl. No.: 763,519

[22] Filed: Dec. 11, 1996

Related U.S. Application Data

[63] Continuation of Ser. No. 269,052, Jun. 29, 1994.

[30] Foreign Application Priority Data

Dec. 13, 1993 [JP] Japan ................... 5-312031

[51] Int. Cl.$^6$ .................................. H04Q 7/20
[52] U.S. Cl. ................ 455/414; 455/417; 455/422; 379/201
[58] Field of Search ............................ 455/414, 416, 455/417, 422, 424, 426, 420, 433, 445, 518; 329/201, 207, 210–212, 216, 258, 265, 268, 269

[56] References Cited

U.S. PATENT DOCUMENTS

| 5,157,660 | 10/1992 | Kuwahara et al. . | |
|---|---|---|---|
| 5,206,901 | 4/1993 | Harlow et al. . | |
| 5,239,577 | 8/1993 | Bates et al. . | |
| 5,243,645 | 9/1993 | Bissell et al. | 379/60 |
| 5,251,248 | 10/1993 | Tokunaga et al. | 379/58 |
| 5,260,986 | 11/1993 | Pershan | 379/207 |
| 5,315,637 | 5/1994 | Breeden et al. | 379/58 |
| 5,325,424 | 6/1994 | Grube | 379/216 |
| 5,392,342 | 2/1995 | Rosenthal | 379/207 |
| 5,548,636 | 8/1996 | Bannister et al. | 379/201 |

FOREIGN PATENT DOCUMENTS

| 0 549 016 | 6/1993 | European Pat. Off. . | |
|---|---|---|---|
| 0546467 | 6/1993 | European Pat. Off. | 379/58 |
| 93/18606 | 9/1993 | WIPO . | |

OTHER PUBLICATIONS

K. Okamoto, "A study on Enhancement of Digital Cordless Telephone System in a PABX" ISS '92, Oct. 1992, vol. 1, pp. 184–188.

IEEE article, "Advanced Personal Communication System", Apr. 1990, Kohiyama et al., pp. 161–166.

World publication (WO 093017515), Kay et al., Sep. 1993.

Primary Examiner—Dwayne D. Bost
Assistant Examiner—Nay Maung
Attorney, Agent, or Firm—Helfgott & Karas, PC.

[57] ABSTRACT

Comprises a mobile network exchange and a fixed network exchange in a composite communications network comprising a mobile network and a fixed network, or an integrated exchange in an integrated communications network, and a database which is accessed in common by the above-mentioned exchanges, and the above-mentioned exchanges call all or some of the terminals of groups comprising a combination of mobile terminals and fixed terminals, in accordance with the group data, or perform terminal change-over between the mobile terminals and the group terminals, in accordance with the above-mentioned group data.

12 Claims, 30 Drawing Sheets

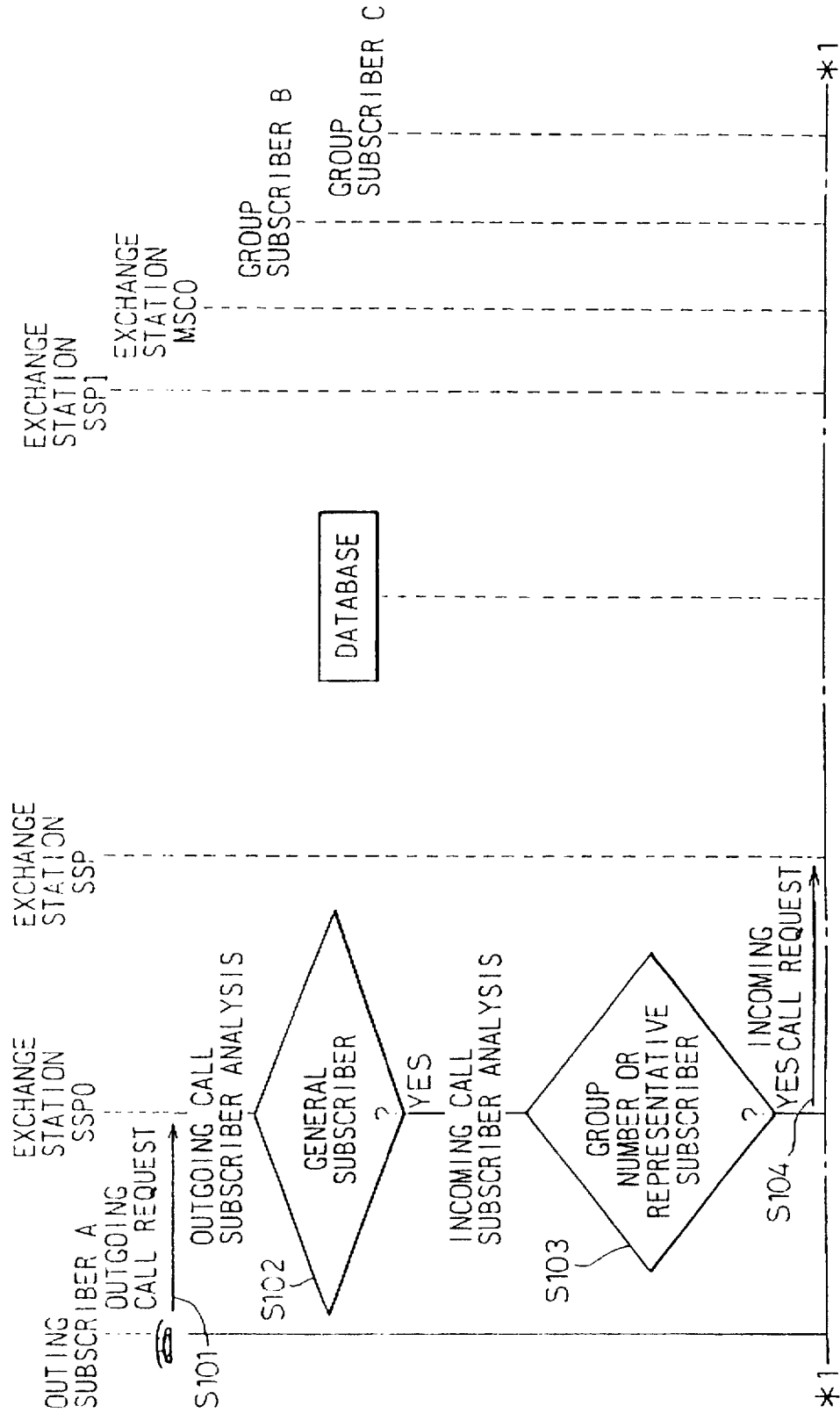

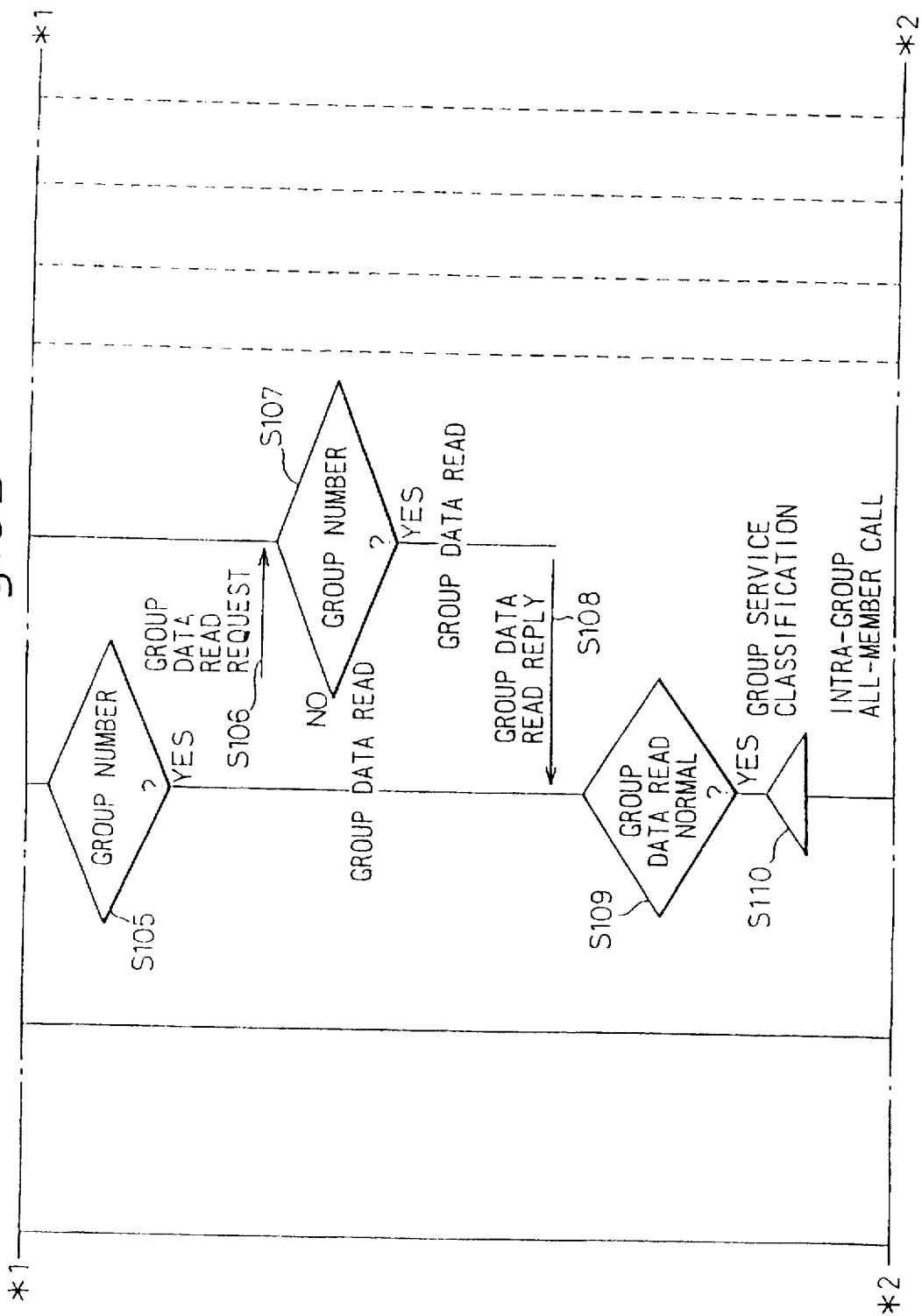

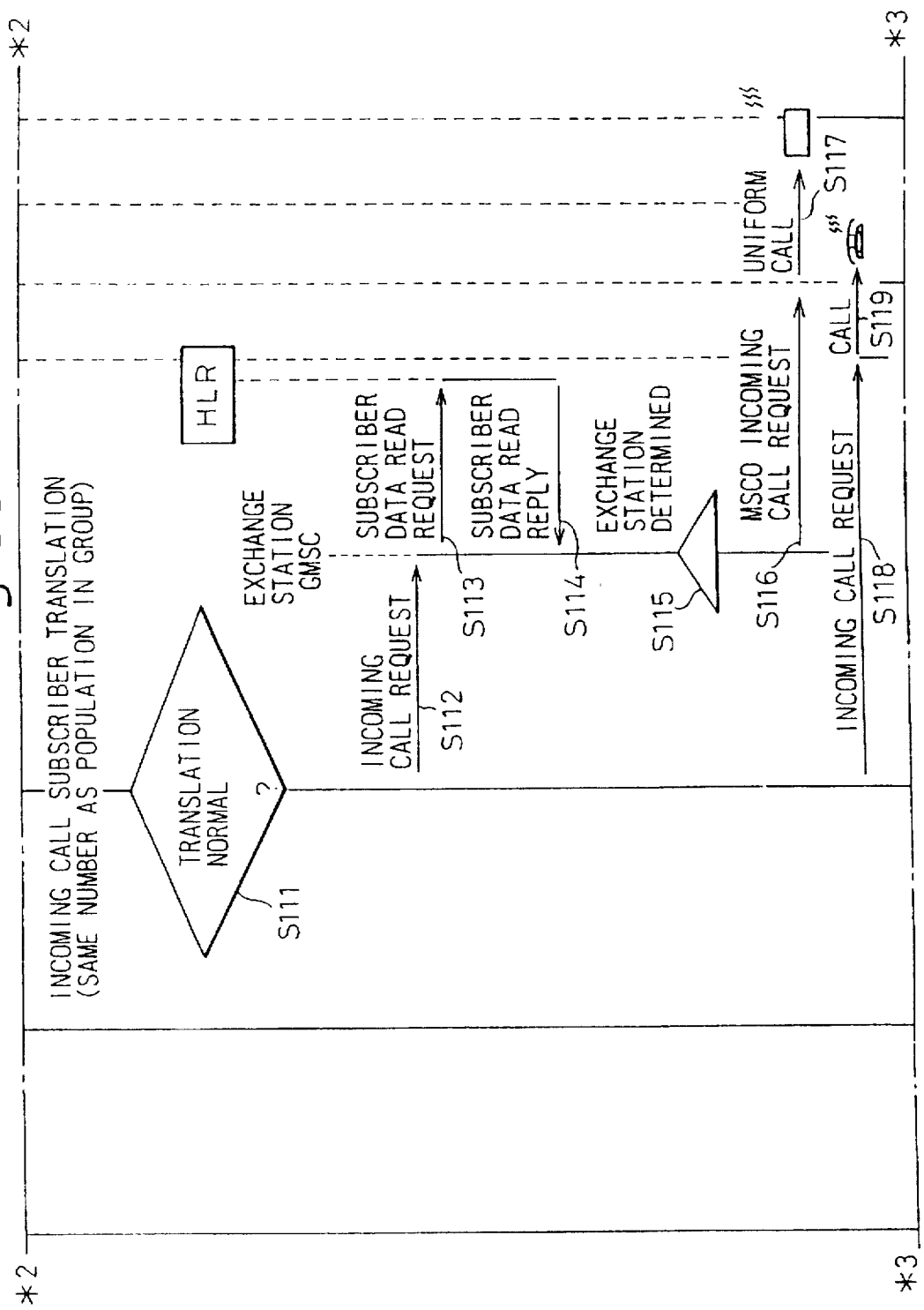

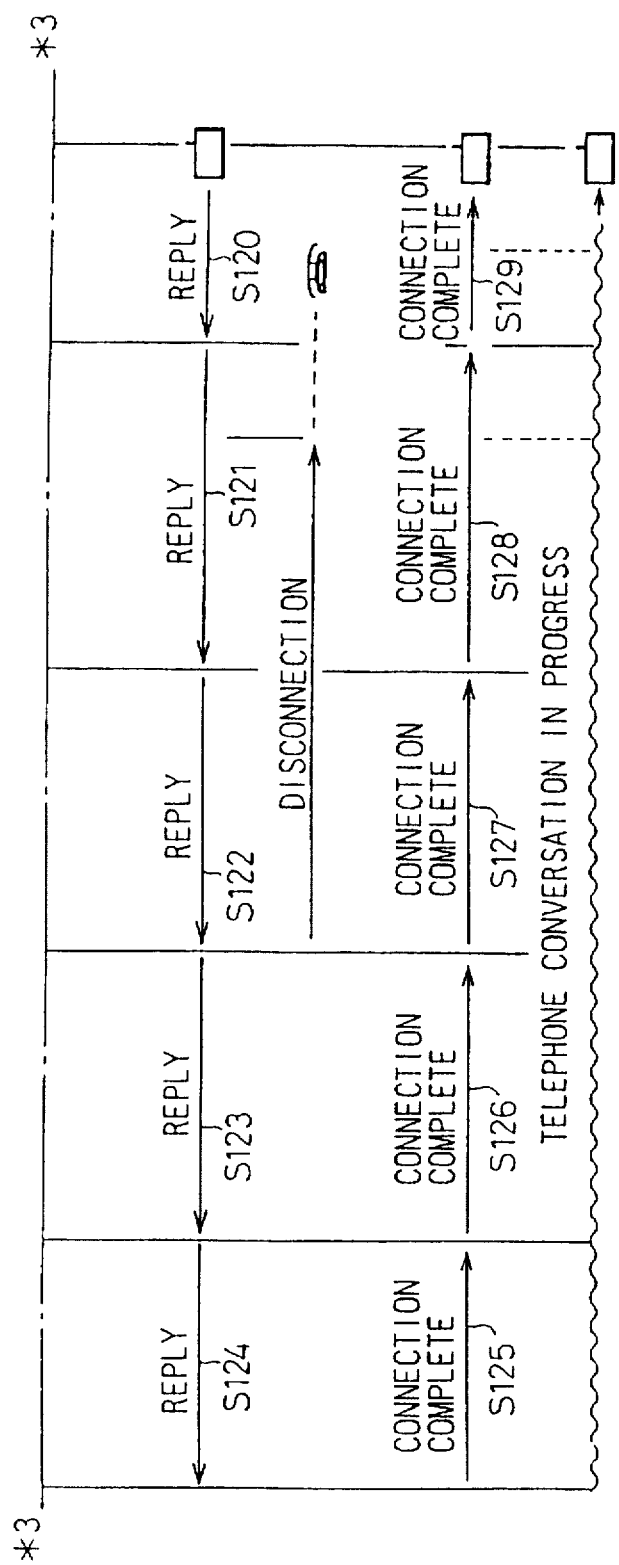

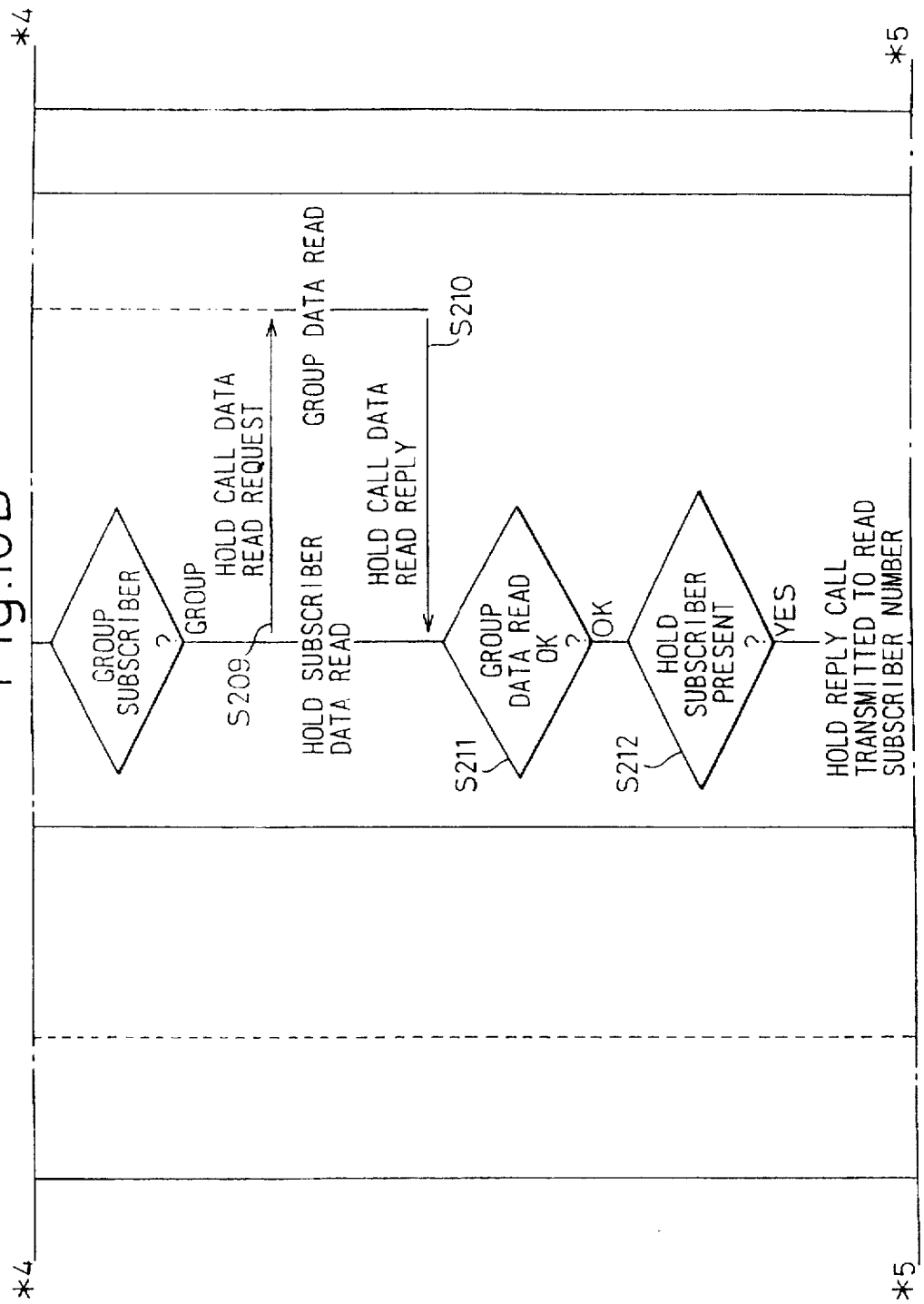

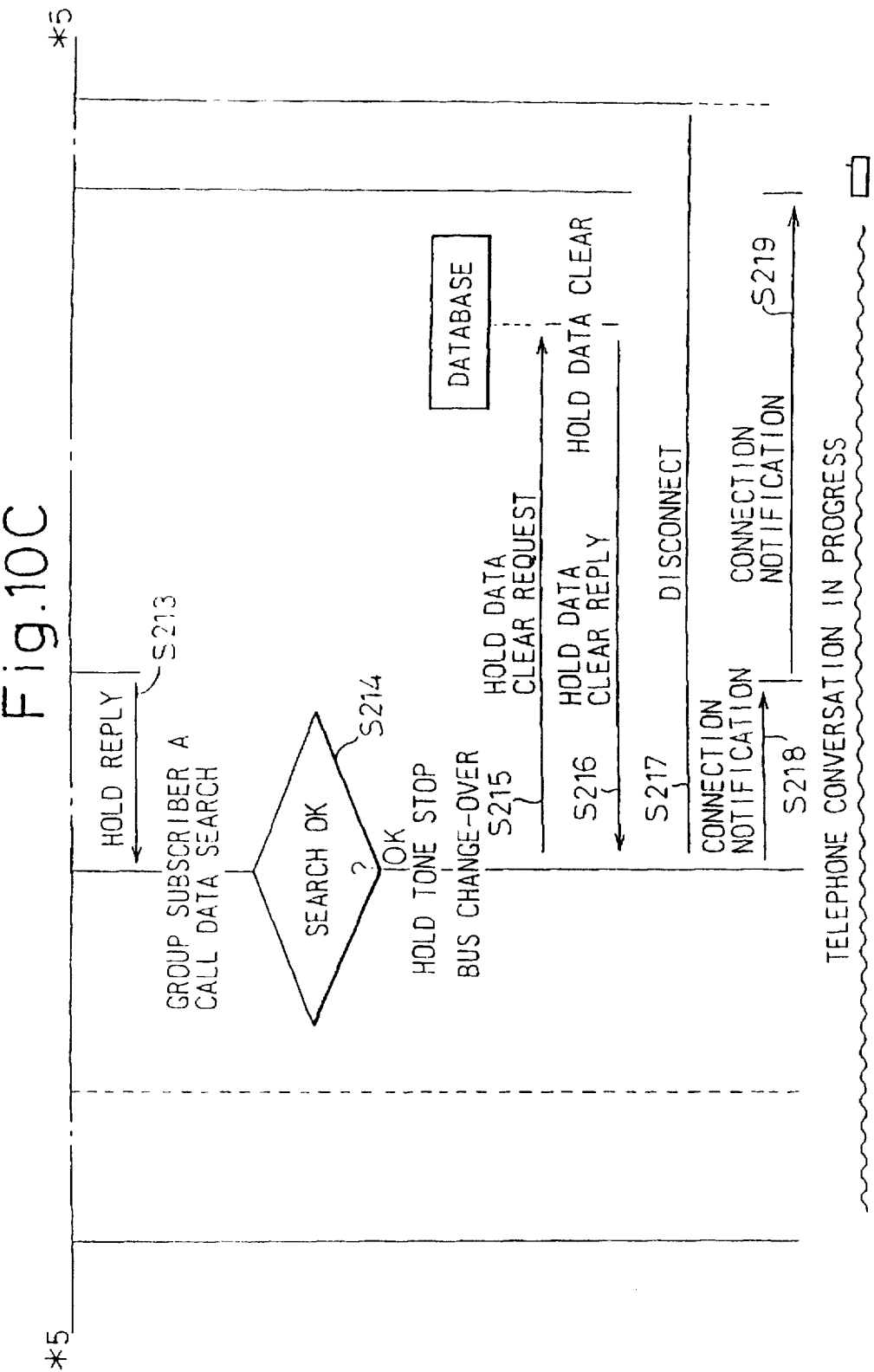

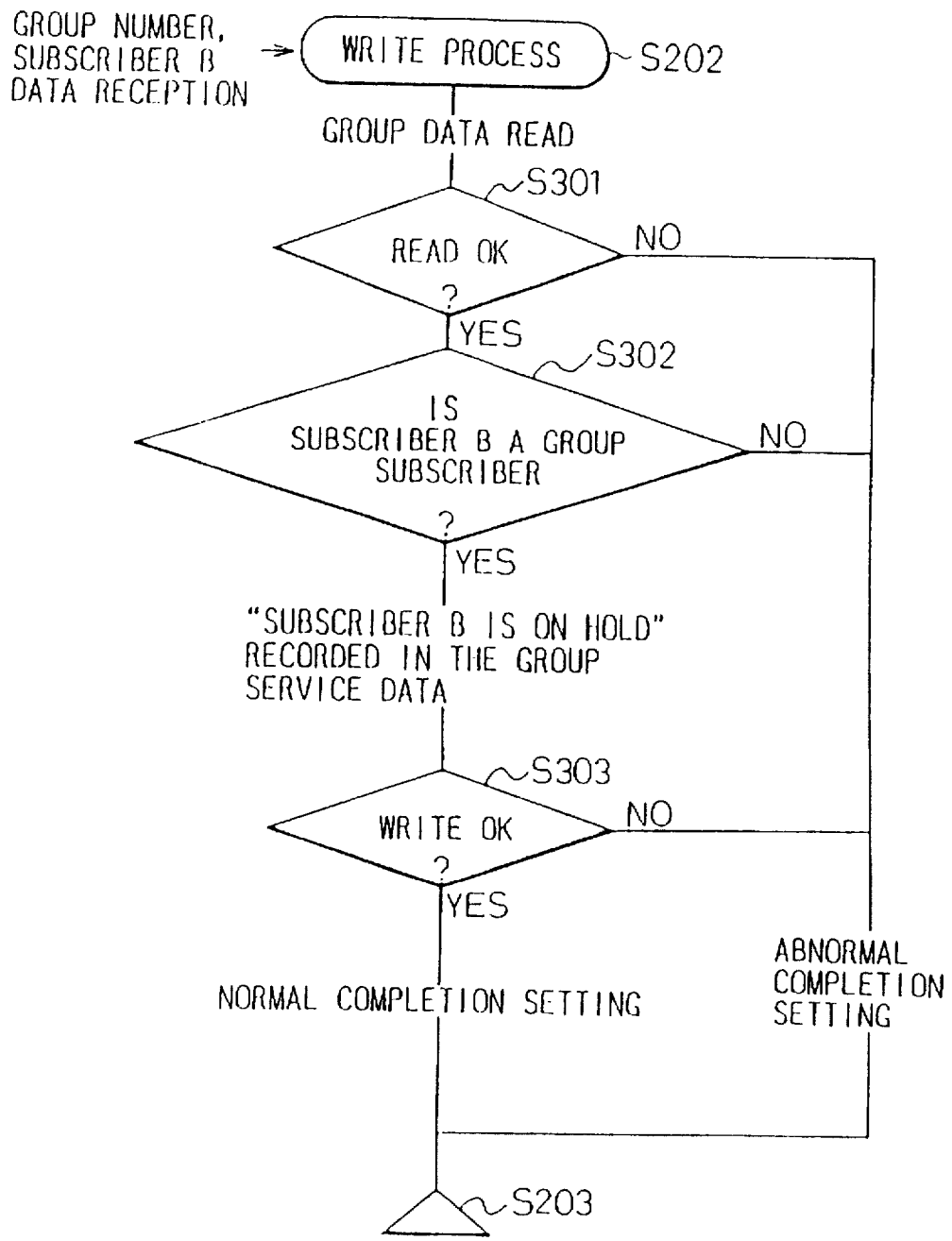

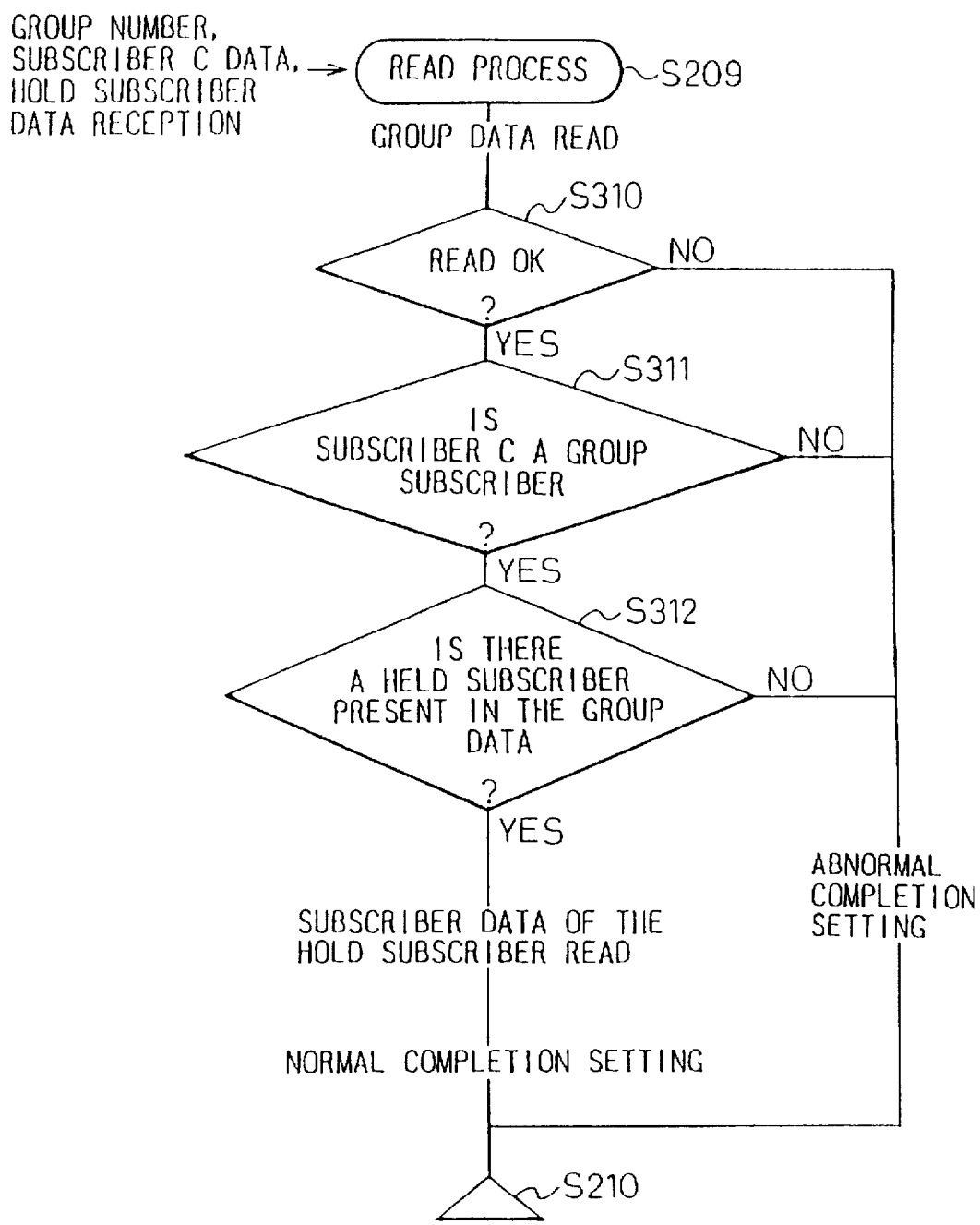

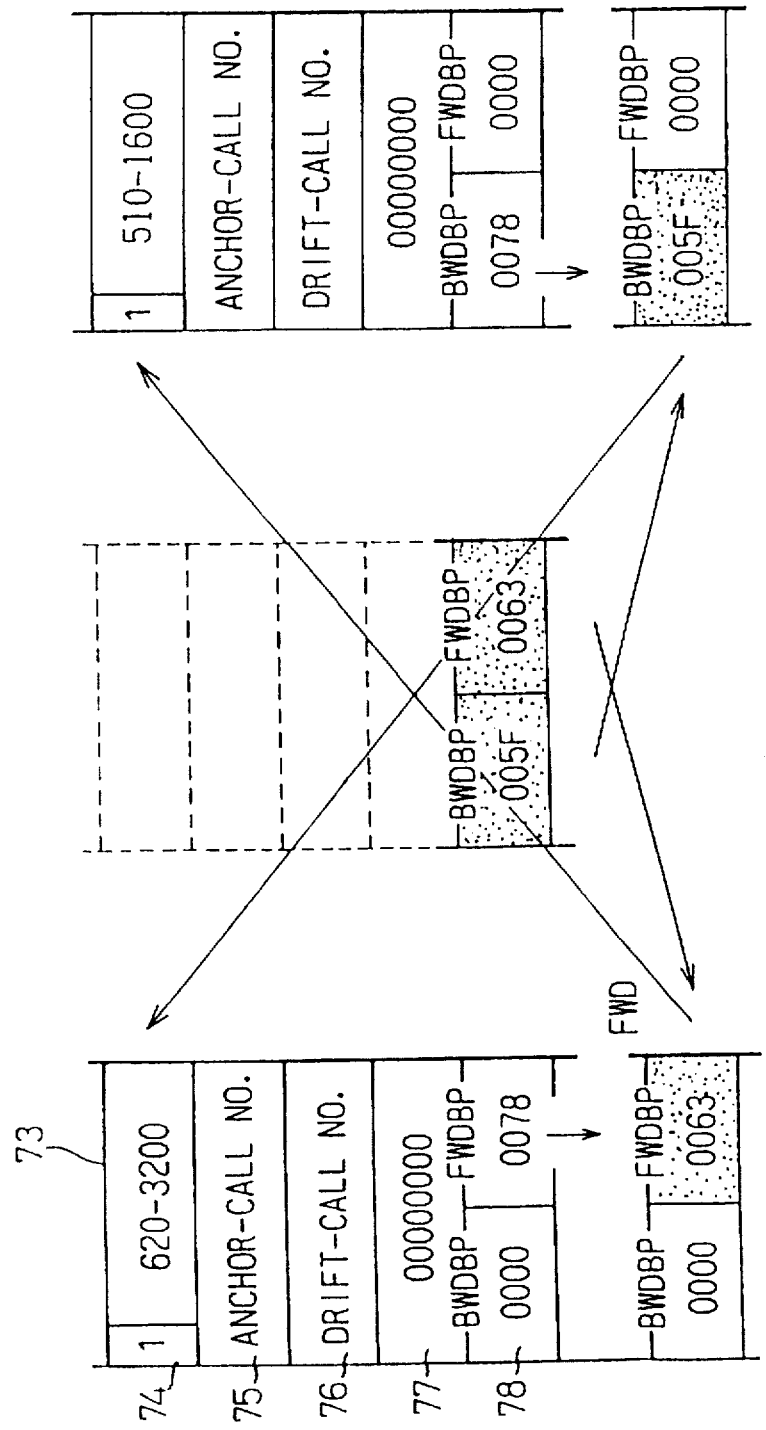

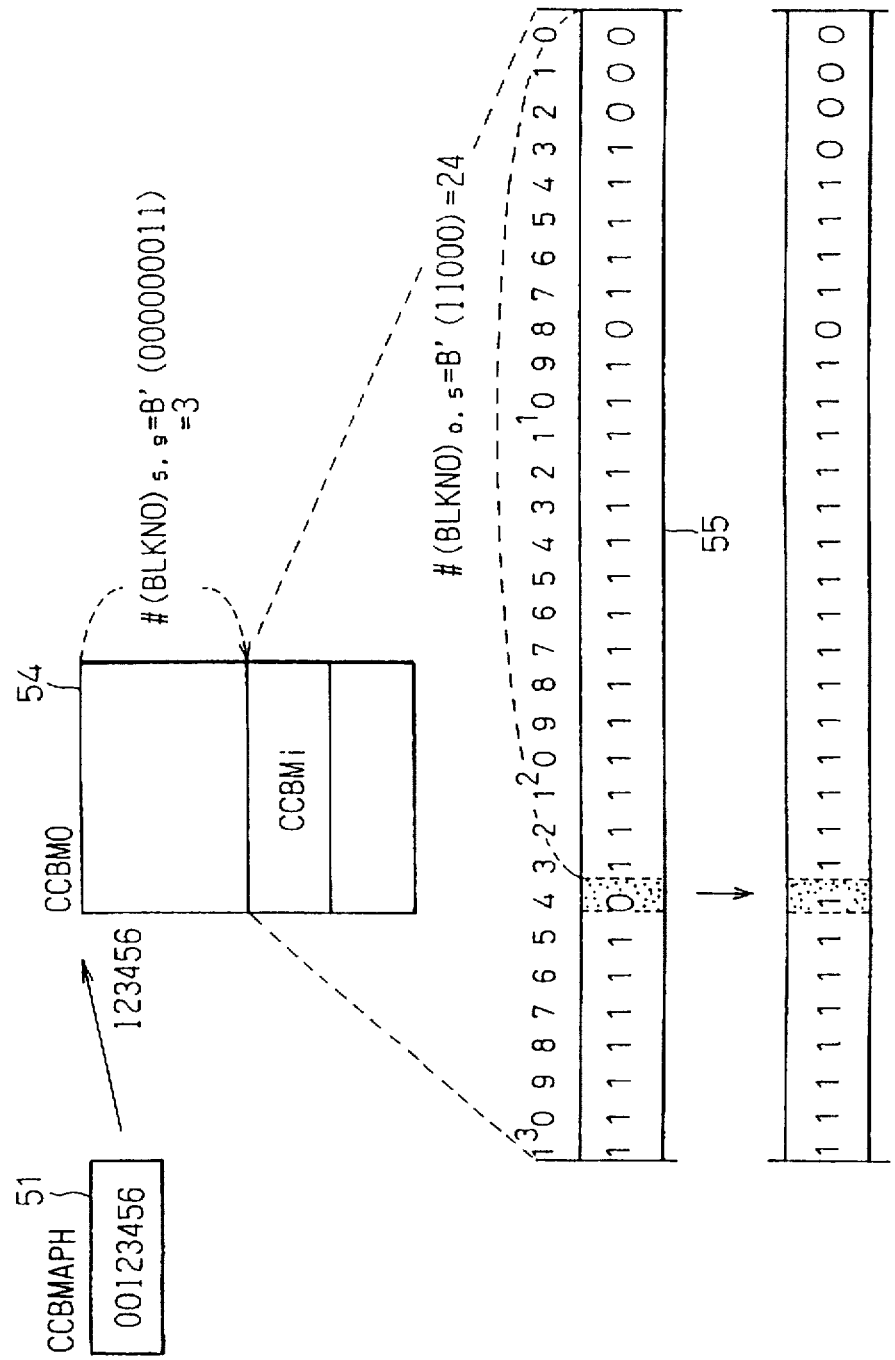

METHOD OF PROCESSING CALLS BETWEEN MOBILE TERMINALS AND FIXED TERMINALS

This is a continuation of application Ser. No. 08/269,052, filed Jun. 29, 1994.

BACKGROUND OF THE INVENTION

1. Field of the Invention

The present invention relates to a method and device for processing calls between mobile terminals and fixed terminals, and in particular relates to a method and device for, inter alia, performing group calls between mobile terminals and fixed terminals, terminal change-over for a busy call, and rapid searching of call data relating to these.

2. Description of the Related Art

The number of subscribers of mobile terminals (portable telephones) has increased in recent years. However, when a subscriber of the above-mentioned mobile terminal makes an outgoing call, or when he receives a call, he will not necessarily always use the mobile terminal, and in fact many subscribers use both mobile terminals and fixed terminals (domestic telephones).

An example of the way in which the above-mentioned mobile terminals are used is for the subscriber to carry the mobile terminal only when going out, and to turn the power supply of the mobile terminal on only when making an outgoing call. In order to reduce the power consumption in the mobile terminal, the power supply is off at other times, but if the subscriber knows that he is going to receive a call, he will turn the power supply on for incoming call stand-by. Then, when in the office or at home, the subscriber uses the domestic telephone located indoors. In this way, the subscriber who uses both the above-mentioned mobile terminal and a fixed terminal simply divides their use as necessary, and the above-mentioned mobile terminal and fixed terminal are used as separate independent items.

However, problems such as those described below arise when a call is made to a subscriber who uses both a fixed terminal and a mobile terminal as described above.

To elaborate, various situations can be imagined, for example, the telephone number of the fixed terminal of the above-mentioned subscriber is dialed, but the individual is not in and there is no reply, after which the telephone number of the mobile terminal is redialed, or the opposite case in which the telephone number of the mobile terminal is dialed, but for some reason such as, for example, that the power supply of the terminal is off as described above, or that it is in a region which electronic transmission can not reach and the call cannot be received, or for example a situation in which, after the call has been received, it is not possible to reply to the call, after which the telephone number of the fixed terminal is redialed, and in these cases troublesome and inconvenient dealings are required such that calls to subscribers having the above-mentioned mobile terminals and fixed terminals are divided between the telephones.

On the other hand, for subscribers using the above-mentioned mobile terminals and fixed terminals, in situations such as those in which, for example, the time comes for the subscriber to go out of the house while talking on the domestic terminal, or when the subscriber is talking on the mobile terminal and the communication quality suddenly deteriorates due to a change in the transmission/reception conditions when he enters a building from outside, the current situation is that, since there is no means for performing mutual change-over between a mobile terminal and a fixed terminal, during a call, without interrupting the call, there is no choice but to perform a troublesome operation such as to temporarily halt the telephone conversation and then redial from another terminal to the party to whom the call is being made, or otherwise, in situations such as that described above, to delay going out, or to put up with the degradation of sound quality.

Moreover, when either of the mobile terminal or fixed terminal are dialed, as described above, or if it is decided to mutually change over between a mobile terminal and a fixed terminal, it is necessary to search for the call data for each of the subscribers. For example, when a call is made to the subscriber of the mobile terminal, first of all the Home Location Register (HLR) in the mobile network is accessed, and by searching for the Line Memory (LM) in which the line data of the above-mentioned called party is written, its state (free or busy) is determined. At this time, if, for example, the above-mentioned called party is having a telephone conversation, and has subscribed to a call waiting service or a three way service, then the Call Control Block (CCB) memory region, in which the call data being used by the called party is written, is searched, the T-channel wireless telephone channel number is read out from the above-mentioned CCB, and the above-mentioned call is connected to this T-channel.

However, if the above-mentioned mobile network consists of a so called "multi-processor system", in other words if it comprises a Main Processor (MPR) which groups the call processing together, and a plurality of Call Processors (CPR) controlled thereby, then the search of the CCB described above, performed by the MPR, is performed by successively searching all of the CPRs which are mounted, until the appropriate CCB is discovered, since it is not possible to determine which CPR the above-mentioned called party is under when moving, during the search.

In the same way, when the operator displays the data of the subscriber who is having a telephone conversation, by means of a command operation, CCB searching is performed by searching all of the CPR from the telephone number of the subscriber.

Therefore, call processing time is increased due to the search processing of all the CPRs, as described above, and in particular when rapid processing is necessary such as when changing over from a fixed terminal to a mobile terminal during a telephone conversation as described above, the increase in the above-mentioned call-processing time is a major problem.

SUMMARY OF THE INVENTION

Thus taking the above-mentioned problems into consideration, a first objective of the present invention is to solve the inconveniences in redialing between a fixed terminal and a mobile terminal, as described above, by forming groups between a plurality of fixed terminals and mobile terminals, and, for a prescribed group service call reception, performing call reception processing on all or some of the subscribers recorded in the group data, in accordance with the content of the service.

Further, a second objective of the present invention is to permit opportune and appropriate use of fixed terminals and mobile terminals by changing over from a fixed terminal during telephone conversation, to a mobile terminal, while maintaining the call, and changing over from a mobile terminal, during telephone conversation, to a fixed terminal, while maintaining the call.

Moreover a third objective of the present invention is to achieve efficient call processing, including the economic result of reducing the amount of memory, when an incoming call is generated in a mobile network with a multi-processor construction by performing search processing of the CCB in which the call data of the called party is written, effectively and in a short time, and moreover reducing the table memory and the like necessary for the search.

According to the present invention, a terminal calling system is provided in a composite telephone network comprising a mobile network and a fixed network, which terminal calling system comprises mobile network exchanges which control connections with the mobile terminals, fixed network exchanges which control connections with the fixed terminals, and a database which is accessed in common by the above-mentioned mobile network exchanges and the above-mentioned fixed network exchanges, the database records data about groups comprising combinations of the above-mentioned mobile terminals and the above-mentioned fixed terminals, and the above-mentioned mobile network exchanges and the above-mentioned fixed network exchanges call all or some of the terminals of a group comprising combinations of the above-mentioned mobile terminals and the above-mentioned fixed terminals, in accordance with the group data of the above-mentioned database.

In the same way, a terminal calling system is provided in an integrated exchange network which unifies control of the mobile terminals and fixed terminals, the terminal calling system comprising integrated network exchanges which control connections with both the mobile terminals and the fixed terminals, and a database which is accessed by the above-mentioned integrated network exchanges, the above-mentioned database records data for groups comprising combinations of the above-mentioned mobile terminals and the above-mentioned fixed terminals, and the above-mentioned integrated network exchanges call all or some of the terminals of a group comprising combinations of the above-mentioned mobile terminals and the above-mentioned fixed terminals, in accordance with the group data of the above-mentioned database.

Further, according to the present invention, a terminal change-over system is provided in the composite communications network which comprises a mobile network and a fixed network, the terminal change-over system comprising mobile network exchanges which control connections with the mobile terminals, fixed network exchanges which control connections with the fixed terminals, and a database which is accessed in common by both the above-mentioned mobile network exchanges and the above-mentioned fixed network exchanges. The database records data about groups comprising combinations of the above-mentioned mobile terminals and the above-mentioned fixed terminals which are the object of the mutual change-over, and the above-mentioned mobile network exchanges change and the above-mentioned fixed network exchange change over and connect mobile terminals or fixed terminals, during telephone conversation, to the corresponding fixed terminals or mobile terminals, without interrupting the above-mentioned telephone conversation, in accordance with the data of the group comprising mobile terminals and fixed terminals, in the above-mentioned database.

In the same way, a terminal change-over system is provided in an integrated exchange network which unifies control of the mobile terminals and the fixed terminals, which terminal change-over system comprises integrated network exchanges which control connections with both the mobile terminals and the fixed terminals, and a database which is accessed by the above-mentioned integrated network exchanges. The above-mentioned database records data about groups comprising combinations of the above-mentioned mobile terminals and the above-mentioned fixed terminals which are the object of the mutual change-over, and the above-mentioned integrated network exchanges change over and connect the mobile terminals or fixed terminals, during telephone conversation, to the corresponding fixed terminals or mobile terminals, without interrupting the above-mentioned telephone conversation, in accordance with the data of the groups comprising mobile terminals and fixed terminals, in the above-mentioned database.

Moreover, according to the present invention, a call data search system is provided in a mobile network exchange which performs control of connections with mobile terminals, having a multi-processor system comprising a plurality of call processors (CPR) and a main processor (MPR) which groups the above-mentioned plurality of call processors together, and said main processor has a call data search table in which are recorded the number (CCB number) of the memory block in which the call data in use is written, and the above-mentioned call processor number (CPR number), the call processor controlling the memory block in which the above-mentioned call data in use is written.

According to the terminal calling system of the present invention, the mobile terminal and the fixed terminal of a subscriber who uses both a mobile terminal and a fixed terminal, for example, are recorded as one group in the database which is accessed in common by the exchanges which respectively control mobile terminals and fixed terminals, or by an exchange which integrates these and controls them. When an incoming call to the above-mentioned combined-use subscriber is generated, the exchange, when it determines by the incoming call subscriber analysis processing that it is a group subscriber according to the present invention, accesses the above-mentioned database, and calls each of the mobile terminals and fixed terminals grouped as mentioned above, in accordance with the group data recorded in the database, without distinguishing between mobile terminals and fixed terminals.

It should be noted that in the above-mentioned grouping, various group service modes can be considered, for example calling all or some of the terminals in the group.

Also, according to the terminal change-over system of the present invention, the mobile terminal and the fixed terminal which are the object of mutual change-over when the above-mentioned combined-use subscriber, for example, is making a telephone call, are recorded as one group in the database which is accessed in common by the exchanges which respectively control mobile terminals and fixed terminals, or the exchange which integrates these and controls them, and telephone conversation hold, and the like, are set as the above-mentioned group service data. If the above-mentioned subscriber indicates for example that one of the fixed terminals recorded in the group should be held during a telephone conversation, then the exchange writes this holding instruction content in the above-mentioned database. Next, if the above-mentioned subscriber issues a hold answer instruction from another mobile terminal recorded in the above-mentioned group, then the exchange determines from the database that the above-mentioned subscriber is on hold within the group, and changes over the telephone conversation path to the mobile terminal in the same group.

Moreover, according to the data search system of the present invention, the above-mentioned call data search table searches the CCB block table based on the block number (BLKNO) written in a search table indexed by the subscriber's Mobile Subscriber Number (MSN). At this time, the search processing time and the amount of search table which is mounted are reduced by using a prescribed function in the index according to the above-mentioned MSN. Also, although the probability is extremely small, it is possible that the same block number generated thereby is given to a different MSN, but this is overcome by forming a link between CCB block tables which have the same block number. The appropriate MSN and call processor number are determined from the data in the CCB block table.

BRIEF DESCRIPTION OF THE DRAWINGS

The present invention will be more clearly understood from the description as set forth below, with reference to the accompanying drawings, wherein:

FIGS. 8A–8D are sequential diagrams showing an example of the exchange processing sequence in the embodiment of FIG. 7.

FIGS. 10A–10C are sequential diagrams showing an example of the change-over processing sequence in the embodiment of FIG. 9.

FIG. 11 is a flow diagram showing one example of the write process in the database.

FIG. 12 is a flow diagram showing one example of the read process in the database.

FIG. 25 is a functional diagram showing an example of a CCB data erasing process (2).

FIG. 26 is a functional diagram showing an example of a CCB data erasing process (3).

DESCRIPTION OF THE PREFERRED EMBODIMENTS

Figure 1:
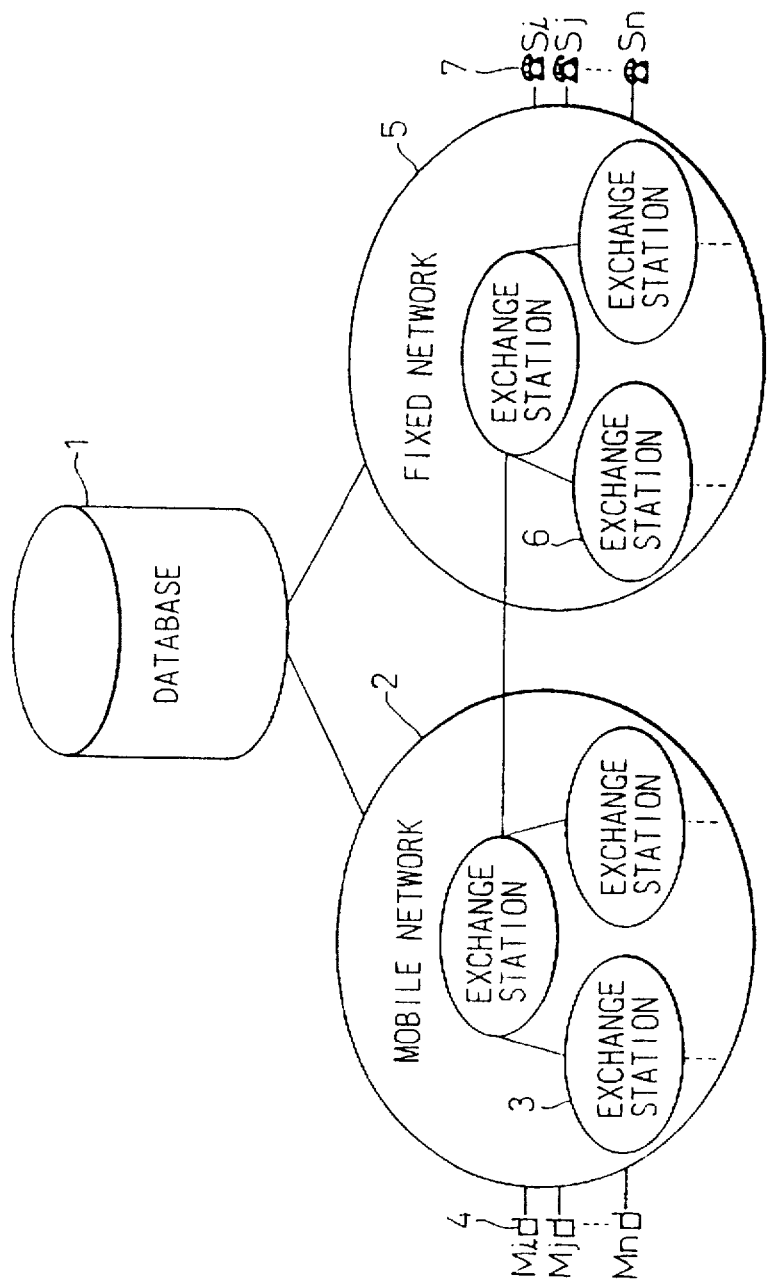
FIG. 1 is a block diagram showing the basic network structure of the composite exchange network as applied to the present invention, in diagrammatic form.

FIG. 1 shows a basic network configuration for the composite exchange network as applied to the present invention. In the same way, FIG. 2 shows the basic network configuration of the integrated exchange network as applied to the present invention.

As shown in FIG. 1, the composite exchange network comprises a mobile network 2 and a fixed network 5, and mobile network exchanges 3 which cover prescribed areas are located in each area unit, in the former, and mobile terminals 4, for example portable telephones and car telephones, are connected thereto by radio. Also, a plurality of fixed network exchanges 6, in accordance with the number of subscribers, is located in the latter, and for example a standard fixed telephone 7 is connected thereto via the subscribers line. The database 1 of FIG. 1 is a basic constructional element of the present invention, and is accessed by both the above-mentioned mobile terminal exchange 3 and the fixed network exchange 6, and its operation is described below.

Figure 2:
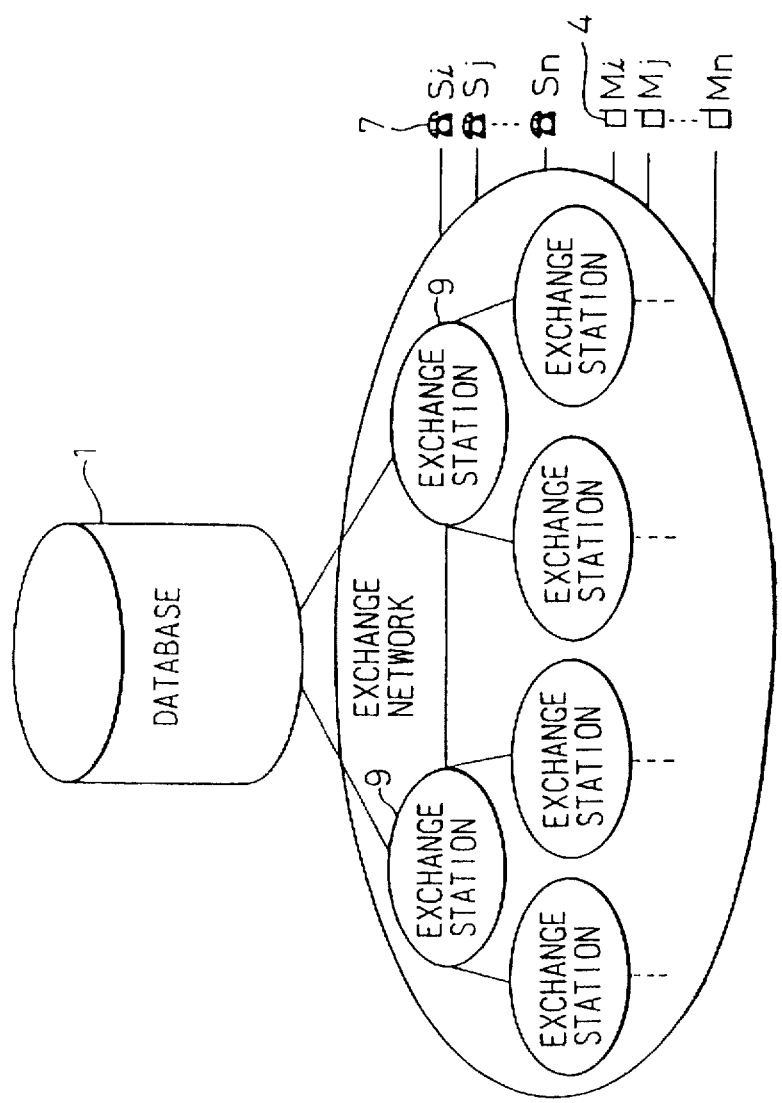
FIG. 2 is a block diagram showing the basic network configuration of the integrated exchange network as applied to the present invention, in diagrammatic form.

The integrated exchange network 8 shown in FIG. 2 is an example of a network which deals in an integrated manner with both voice and data, as for example an ISDN (Integrated Services Digital Network), and the integrated network exchange 9 used thereby is drawn as an item which is provided with the functions of both the mobile network exchange and the fixed network exchange, described above, and is connected to both the mobile terminals 4 and fixed terminals. The database 1 of FIG. 2 is a basic constructional element of the present invention, and is accessed by the above-mentioned integrated network exchange 9, and its operation is described below.

Figure 3:
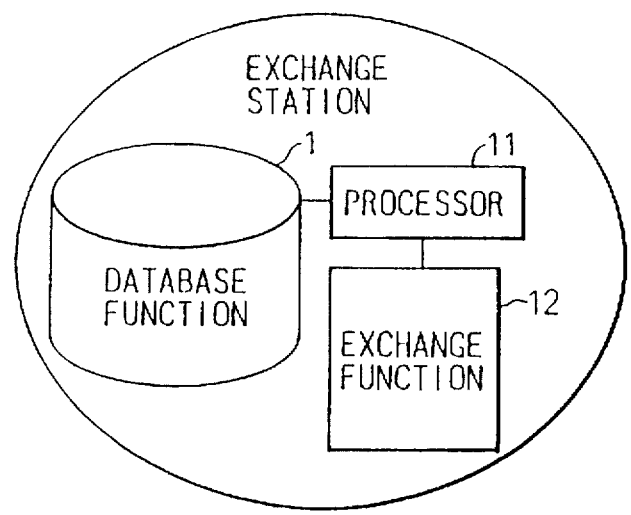
FIG. 3 is a block diagram showing an example in which the exchange has a database function, in diagrammatic form.

FIG. 3 shows an example in which, for example, the database 1 is located in the exchange of the integrated network exchange.

In FIG. 3, the so called central processing unit 11 accesses the database 1 described above, and controls the exchange function unit 12 comprising, for example, subscriber circuit devices and various trunk devices.

Figure 4:
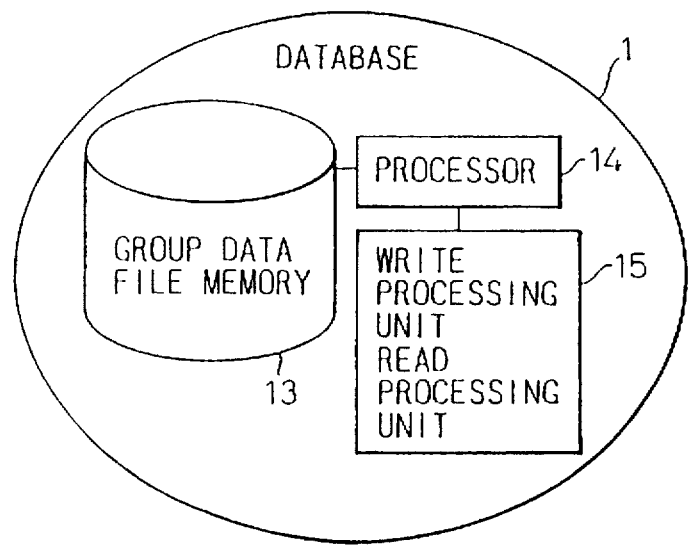
FIG. 4 is a block diagram showing a constructional example of the database, in diagrammatic form.

FIG. 4 shows the general construction in the above-mentioned database 1.

As shown in FIG. 4, the database 1 comprises a processor unit 14 which performs processing of, for example, data and files, and it comprises a memory device unit 13 which stores various files and data, in particular the group data of the present invention, described hereinafter, and an access control potion 15 which performs read and write processes on the above-mentioned data and files.

Figure 5:
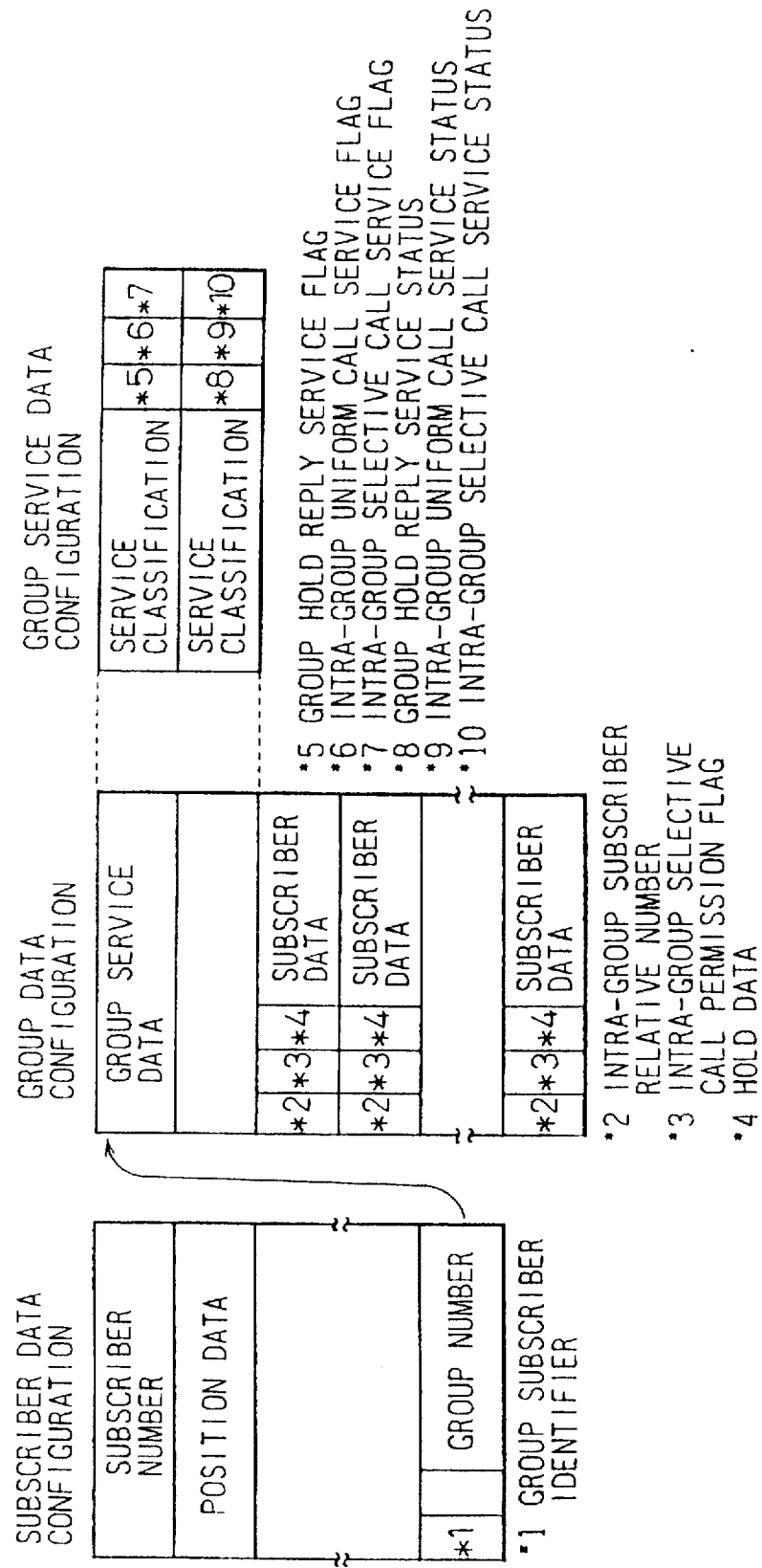
FIG. 5 is a diagram showing an example of the group data configuration according to the present invention.

FIG. 5 shows an example of the group data configuration used in a later embodiment according to the present invention.

According to the subscriber data configuration on the exchange side according to the present invention, a group number corresponding to the normal subscriber number is recorded together with the usual subscriber number and the position data. A flag which determines whether or not the subscriber is a group subscriber, in other words the group subscriber identifier (*1) is added to the left end (MSB; Most Significant Bit) of the above-mentioned group number. It should be noted that the above-mentioned position data is, in the case of a fixed terminal subscriber, the accommodation position data for the subscriber line of the subscriber, and in the case of a mobile terminal subscriber, the area data of the base station in which the subscriber was most recently recorded as being located.

Figure 6:
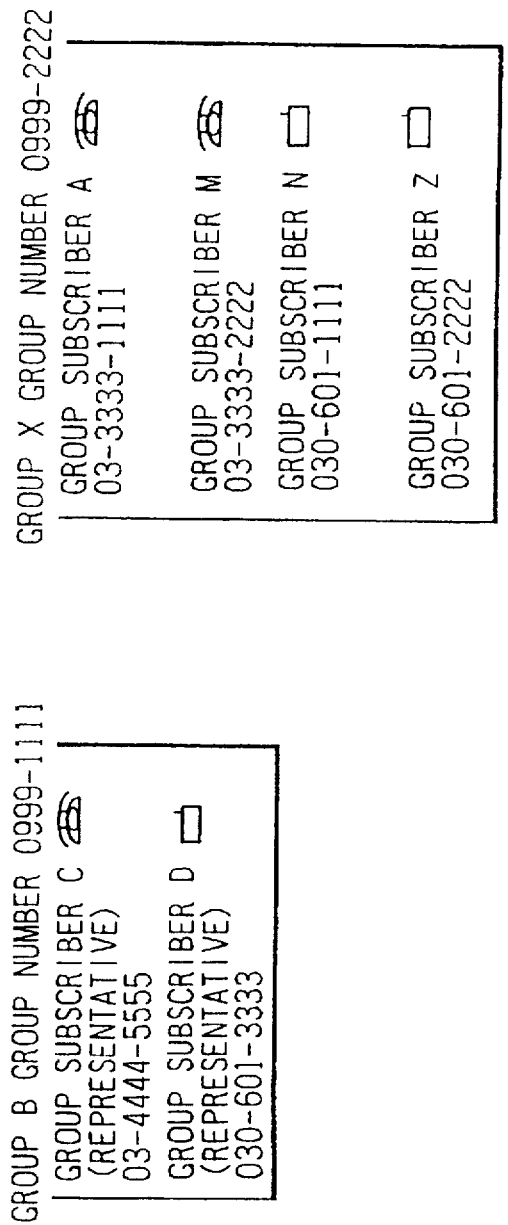
FIG. 6 is a diagram showing an example of the group number classification.

FIG. 6 shows an example of the group number classification. It should be noted that each group comprises mobile terminal subscribers and fixed terminal subscribers, due to the objectives of the present invention.

Two group examples, group B and group X are shown in FIG. 6. The former comprises a fixed terminal group subscriber C and a mobile terminal group subscriber D, and each of these are given the group number 0999-1111, as group representative subscribers. The latter comprises fixed terminal group subscribers A and M, and mobile terminal group subscribers N and Z, to which a group number 0999-2222 is given as general group subscribers.

A brief explanation concerning the group representative subscriber shown in group B of FIG. 6 will now be given.

In this case, the group is divided into group representative subscribers and group elementary subscribers, wherein group representative subscribers are subscribers which can use a group service when a call is received by the subscriber, and group elementary subscribers cannot use a group service by themselves, when a call is received by the subscriber, even if they can subscribe to the group service. This distinction is made by recording the above-mentioned group subscriber identifier under the group number 0999-1111 in the subscriber data of the group representative subscribers, and in contrast not recording these in the subscriber data of the group elementary subscribers.

Group X in FIG. 6 shows a case in which a normal group is combined from the above-mentioned group subscribers A, M, N and Z. The same group number 0999-2222 is recorded in the subscriber data of each of the above-mentioned subscribers.

It should be noted that it is possible to make an incoming call to a group subscriber by directly dialing the above-mentioned group number, or to dial the normal subscriber number, and it is determined whether or not the called party is a group subscriber from the above-mentioned group number identifier and the group number in the subscriber data, by means of which a call may be made to all subscribers in the group.

Returning once again to FIG. 5, in one example of the group data configuration index by the above-mentioned group number, the above-mentioned group data are recorded in the database 1, as described above.

As outlined above, the group data are divided into group service data which is the group service classification and the service status, and the data about subscribers which make up the group. The group service data configuration of FIG. 5 comprises the service classification and the service status, but, in the case of the diagram, flags showing a list of services provided, comprising, classified by service, a group hold reply service flag (*5), an intra-group uniform call service flag (*6), and an intra-group selective call service flag (*7), are provided. Then status flags, namely a group hold reply service status flag (*8), intra-group uniform call service status flag (*9) and an intra-group selective call service status flag (*10) are provided in the service status, in order to show the actual condition of each service corresponding with the above-mentioned service classification.

The above-mentioned "group hold reply service" is a service by means of which a terminal in the group, during telephone conversation, is set to the hold state, after which it is possible to continue the telephone conversation from another terminal in the group, and with respect to a held fixed terminal or mobile terminal, it is possible to continue from another mobile terminal or fixed terminal in the group. Furthermore, the above-mentioned "intra-group uniform call service" refers to a service which calls all of the subscribers in a group, and the above-mentioned "intra-group selective call service" refers to a service which calls only those subscribers in the group which are in a state in which incoming calls are permitted.

As shown in FIG. 5, the subscriber numbers, for example, of all the subscribers comprising the group are recorded in the subscriber data. It should be noted that in the example in the figure an intra-group subscriber relative number (*2), an intra-group selective calling permission flag (*3) and a hold data (*4) flag, for example, are provided with the data for each subscriber. Of these, the above-mentioned intra-group selective call permission flag is used to select the subscribers with permission to receive calls in the group, when the intra-group selective call service, described above, is provided, and only those subscribers whose incoming call permission flag is set are called. The above-mentioned hold data flag indicates the subscribers in the group who are on hold.

Figure 7:
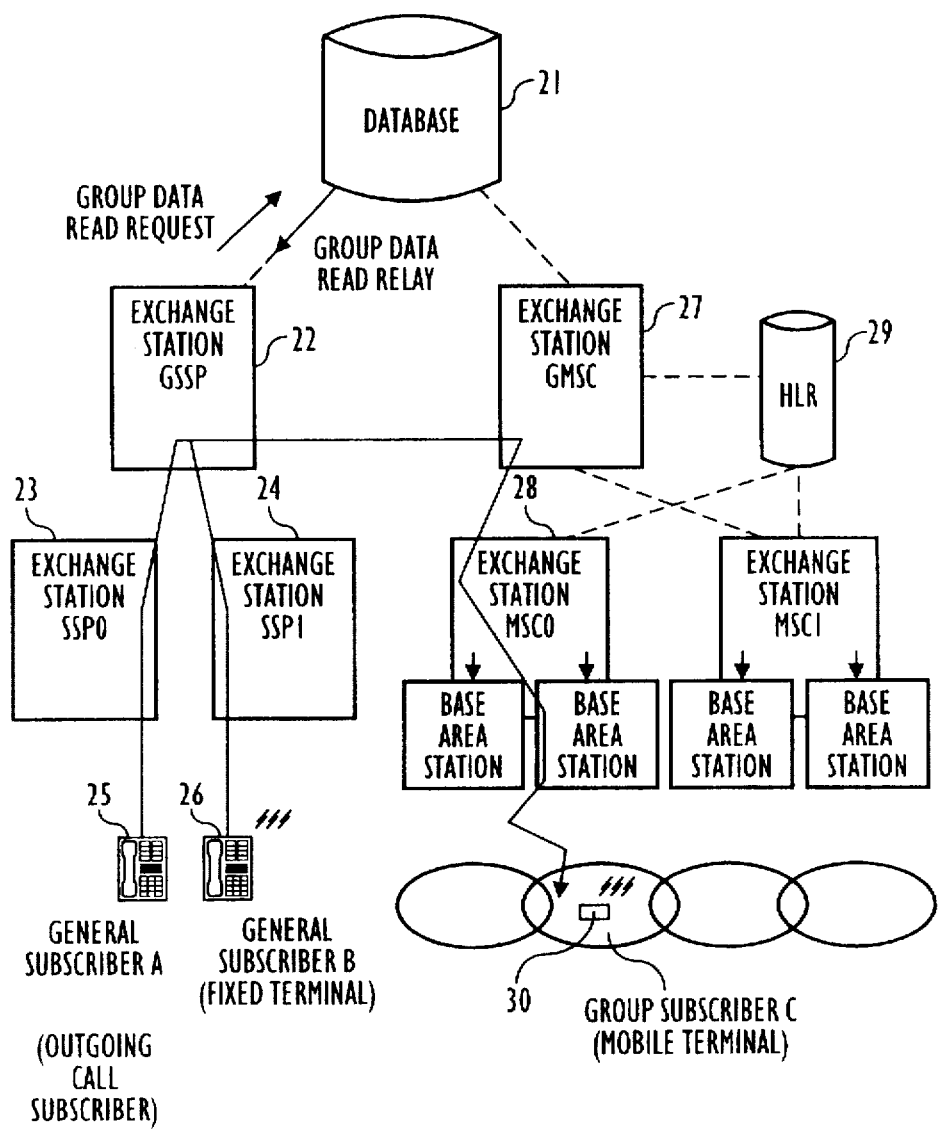
FIG. 7 is a diagram showing one embodiment of terminal calling between mobile terminals and fixed terminals according to the present invention.

FIG. 7 is one embodiment of terminal calling between mobile terminals and fixed terminals, according to the present invention, and shows the case which applies to the composite exchange network explained in FIG. 1.

FIGS. 8A–8D show an example of the exchange processing sequence according to the present invention, in the embodiment of FIG. 7.

In FIG. 7 the database 21 is the same as the database 1 described above. The left half of FIG. 7 shows the fixed network, and comprises fixed network exchanges 22 and 23 and fixed terminals 25 and 26. Also, the right half of FIG. 7 shows the mobile network, and comprises mobile network exchanges 27 and 28 and a mobile terminal 30. It should be noted that the home location register (HLR) 29 is a special mobile network database in which are recorded, for example, mobile terminal subscriber data and mobile terminal data, which the above-mentioned mobile network exchanges 27 and 28 access in common in order to check, for example, the location of the terminal, which is constantly changing, and to perform exchange processing.

The details connected with the group data of the database described above will now be described with reference to the exchange processing sequence of FIGS. 8A–8D, as concerns the embodiment of FIG. 7.

A general subscriber A of the fixed network dials the group number given in common to a fixed terminal 26 of a group subscriber B and a mobile terminal 30 of a group subscriber C, from a fixed terminal 25 (S101). The subscriber exchange station (SSPO; Service Switching Point O) analyzes the outgoing call subscriber and the incoming call subscribers, using the subscriber data shown in FIG. 5, as a result of the above-mentioned request for an outgoing call (S102, 103). By analysing the incoming call subscriber, a request for an incoming call is generated with respect to the upper gateway exchange station (GSSP; Gateway Service Switching Point) 22, when it has been determine that the receiving party is a group subscriber (S104).

The gateway exchange station 22 which performs incoming call processing in the present embodiment issues a group data read request (S106) to the database 21 when it determines that the incoming call request comes from a group number (S105). The above-mentioned database 21 reads the group data (see FIG. 5) indexed by the given group number, and notifies this to the above-mentioned gateway exchange station 22 (S107, 108). The group service classification is determined in the gateway exchange station 22 by referring to the group service data and the subscriber data of the group data which has been notified. In the present embodiment a uniform call is chosen (S110) related to the incoming call processing. Moreover, group subscriber translation is performed, and an incoming call request is issued to the prescribed exchange stations of the fixed network and the mobile network which include the above-mentioned group subscriber. In the example of FIG. 7, the fixed terminal 26 of the group subscriber B connected to the subscriber exchange station (SSP1) 24 in the fixed network, and the mobile terminal 30 of the group subscriber C connected to the subscriber exchange station (MSC0) 28 via the mobile network gateway exchange station (GMSC; Gateway Mobile Switching Center) 27 is the final object of the incoming call.

The mobile network gateway exchange station 27 which has received an incoming call request (S112) from the above-mentioned fixed network gateway exchange station 22 for an incoming call to the mobile terminal 30 accesses the home location register 29 in order to check the location of the mobile terminal 30 which is to receive the incoming call, it receives the base station area data in which the current location of the mobile terminal 30 is recorded, specifies the subscriber exchange station 28, and makes an incoming call request thereto (S113 to 116). The subscriber exchange station 28 which has received the above-mentioned incoming call request outputs a call signal to the mobile terminal 30 (S117).

An incoming call request is issued directly from the above-mentioned gateway exchange station 22 to the subscriber exchange station 24 in which is included the fixed terminal 26 of the group subscriber B, which is under the control of the above-mentioned fixed network gateway exchange station 22 (S118), and the subscriber exchange station 24 calls the fixed terminal 26 in accordance with this (S119).

An intra-group uniform call is performed to both the fixed terminal and the mobile terminal by means of the exchange processing sequence described above. The example of the call reply sequence shown in FIG. 8D shows the case in which the mobile terminal 30 of the group subscriber C replies to the above-mentioned call (S120). The incoming call reply signal from the group subscriber terminals of each of the subscriber exchange stations 24 and 28 is sent to the gateway exchange station 22 which performed the incoming call processing, as a reply message, irrespective of whether it is a mobile network or a fixed network. The gateway exchange station 22 connects the fixed terminal 25 of the outgoing call subscriber A to the mobile terminal 30 of the group subscriber C which replied first (S121 to 129) and cut-off processing is performed with respect to the fixed terminal 26 of the group subscriber B (S130). As a result, a telephone conversation condition is set up between outgoing call subscriber A and the group subscriber C.

It should be noted that the example described above shows the case in which a group call according to the present invention is performed from a fixed terminal, but in the reverse case in which a group call according to the present invention is performed from a mobile terminal, the gateway exchange station 27 on the mobile terminal side accesses the database 21 instead of the gateway exchange station 22 on the above-mentioned fixed network side, and processing is performed in the same way as described above. Also, the above-mentioned example shows the case in which the outgoing call subscriber dials the group number, but the sequence is also the same as that outlined above in the case in which the telephone number of the group representative subscriber B is dialed.

Figure 9:
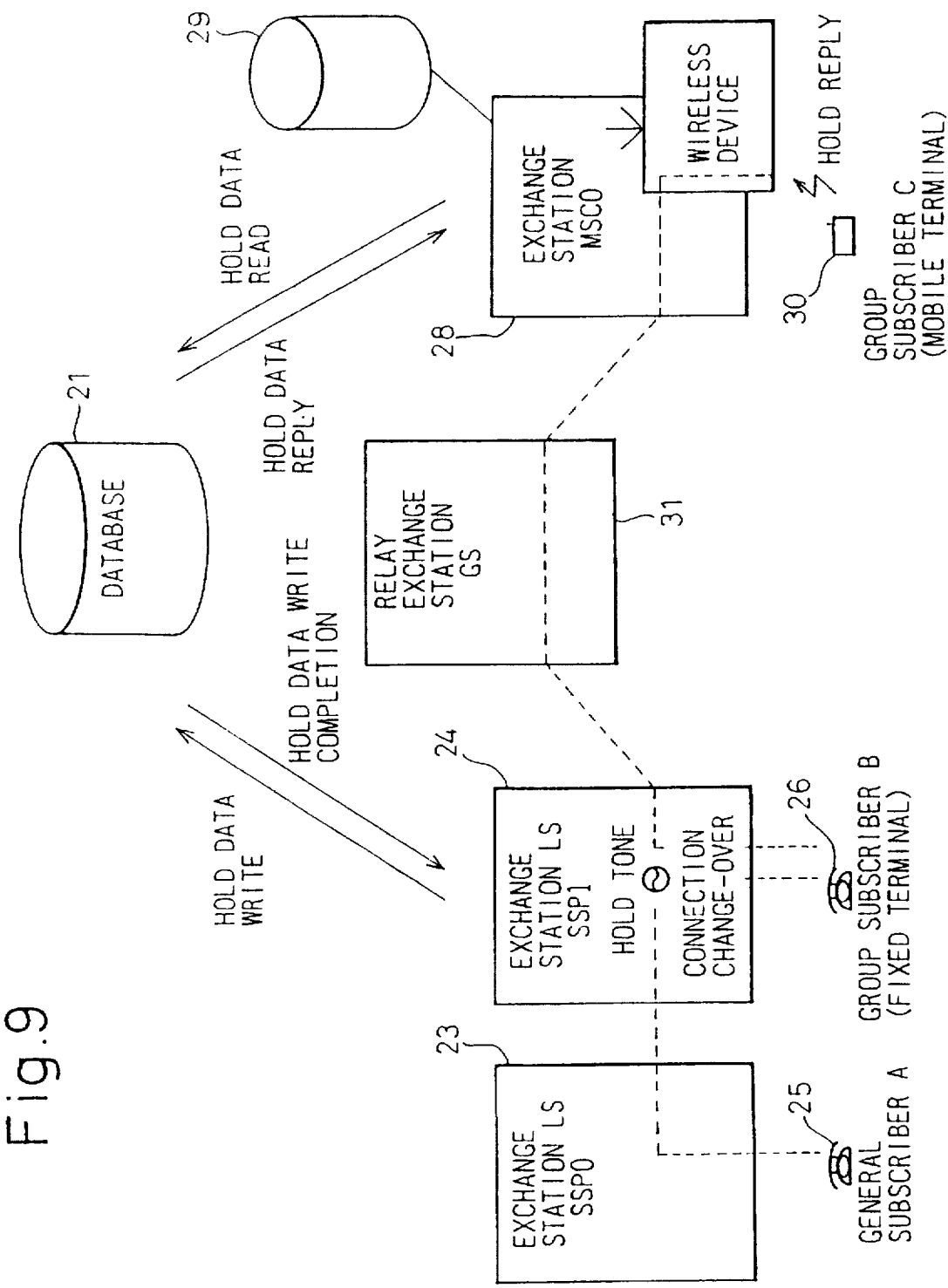
FIG. 9 is a diagram showing one embodiment of the terminal change-over between mobile terminals and fixed terminals, according to the present invention.

FIG. 9 shows an example of terminal change-over between a mobile terminal and a fixed terminal, in accordance with the present invention. FIG. 10A to FIG. 12 show an example of the exchange processing sequence according to the present invention, in the embodiment of FIG. 9.

In FIG. 9, items which are the same as in FIG. 7 described above are given the same references, and their explanation is omitted here. The major difference between FIG. 9 and FIG. 7 lies in the fact that in FIG. 7 the gateway exchange stations 22 and 27 of the fixed network and the mobile network access the database 21, but in FIG. 9 the subscriber exchange stations 24 and 28 of the fixed network and the mobile network each access the database 21 directly. Also, in this embodiment, the connection of the fixed network and the mobile network is performed via a relay exchange station (GS; Gateway Switching) 31 dedicated to relaying.

The details relating to the group data configuration of the database 21 described above will now be described with reference to the exchange processing sequence of FIGS. 10A–10C, in accordance with the embodiment of FIG. 9.

Let us assume that the general subscriber A in the fixed network and the group subscriber B in the same network are having a telephone conversation using respectively fixed terminals 25 and 26, the group subscriber B, who is having a telephone conversation, transmits a hold signal for the fixed terminal 26 to the subscriber exchange station 24 in order to request a call hold (S201). The subscriber exchange station 24 of the fixed network which has received the hold signal transmits a hold tone to the subscriber B and determines that the above-mentioned subscriber B is a group subscriber, from the group subscriber identifier (*1) by referring to the subscriber data (see FIG. 5) held in the station itself. By means of this, the subscriber exchange station 24 of the fixed network accesses the database 21 using the group number and rewrites the hold data (*4 of FIG. 5) of the personal subscriber data as "on hold" (S202, 203). By means of this, the group service data of the database 21 is set to the group hold reply service state (*8 of FIG. 5).

In the example of FIG. 9, the group subscriber C in the same group as the above-mentioned subscriber B then uses a terminal 30 and transmits a hold reply signal to the subscriber exchange station 28 of the mobile network (S204). The subscriber exchange station 28 of the above-mentioned mobile network accesses the home location register 29 described above in order to analyse the outgoing call subscriber, and reads the subscriber data (see FIG. 5) (S205, 206). The subscriber exchange station 28 of the mobile network then accesses the database 21 using the group number (same as subscriber B), after determining, from the group subscriber identifier (*1) of the subscriber data, that the above-mentioned incoming call subscriber C is a group subscriber, and reads the subscriber number of the above-mentioned subscriber B who is on hold from the group data rewritten while the subscriber B is on hold (S207 to S212).

The subscriber exchange station 28 of the mobile network then transmits a hold reply signal (S213) to the subscriber exchange station 24 of the fixed network which includes the subscriber B who is on hold, via the relay exchange station 31. The subscriber exchange station 24 of the fixed network stops the hold tone to the general subscriber A and the subscriber B who is on hold, and clears the hold data by accessing the database 21 (S214 to S216). Finally, the subscriber exchange station 24 of the fixed network opens the bus of the group subscriber B and performs bus setting processing with the mobile terminal 30 of the group subscriber C which is in the area of the mobile network subscriber exchange station 28, via the relay exchange station 31 (S217 to S219).

Figure 10A:
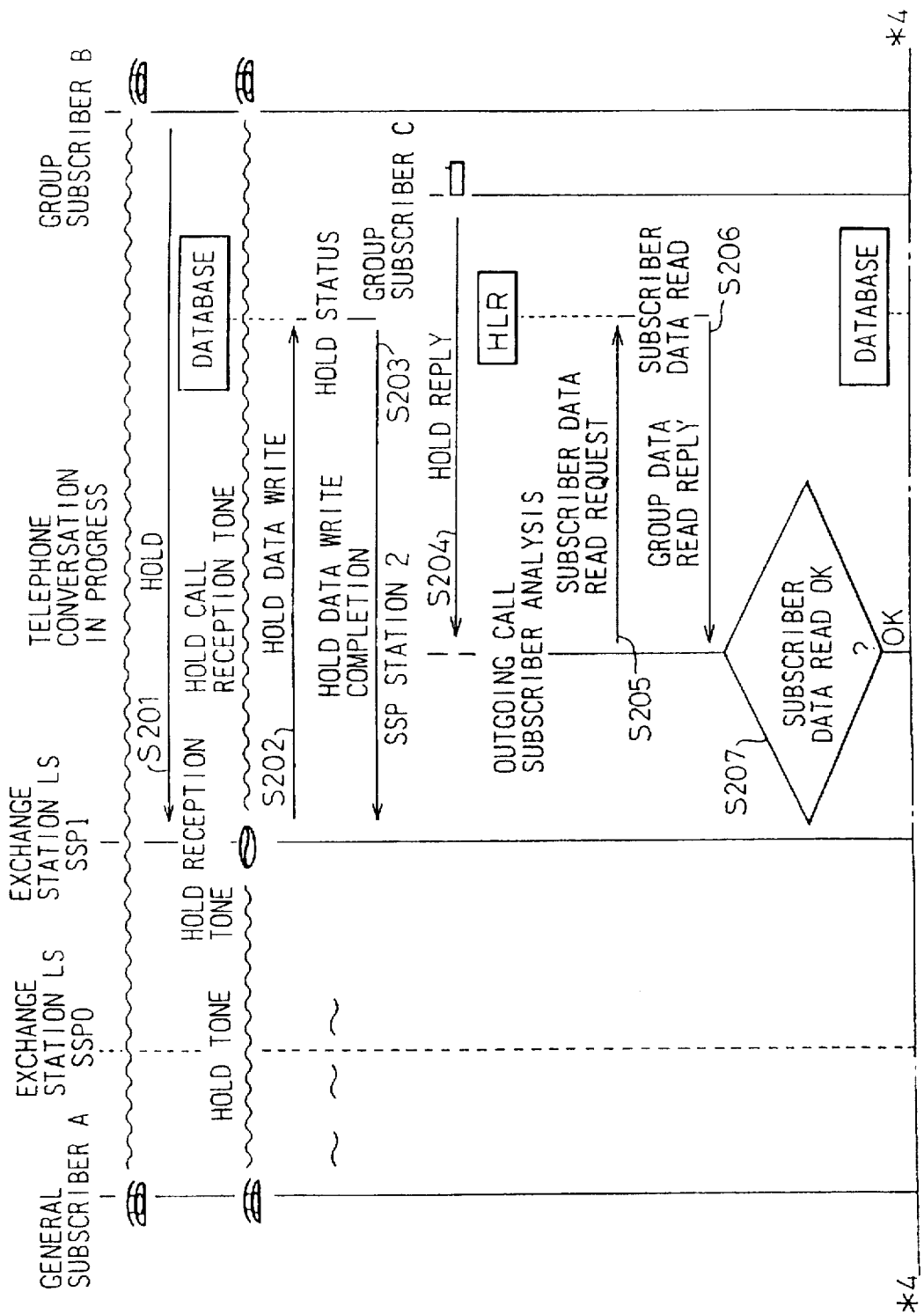

FIG. 11 and FIG. 12 show an example of the process flow in the database in the exchange processing sequence shown in FIGS. 10A–10C. FIG. 11 shows an example of the write process in the database 21 and FIG. 12 shows an example of the read process in the database 21. The database 21 itself is one data processing device, as described in FIG. 4, and performs reading and writing of the file memory, for example, in the device itself, in accordance with access requests from the exchanges.

In FIG. 11 step numbers S202 and S203 correspond to the respective step numbers shown in FIGS. 10A–10C. The database 21 reads the corresponding group data (FIG. 5), indexed by the group number (S301), in accordance with a hold data write request concomitant with the data of the data reception signal, for example, of the subscriber B and the above-mentioned group number. It is then checked from the subscriber data that the subscriber B is a group subscriber, and an "on hold" indication is recorded in the hold data (*4) and the group hold reply service status (*8) of the group service data (S302 to S303).

Step numbers S209 and S210 in FIG. 12 correspond to those steps numbers shown in FIGS. 10A–10C, and the database 21 reads the same group data (FIG. 5) as in FIG. 11, indexed by the group number, in accordance with a signal receive request of the hold subscriber data, together with the data, for example, of the group number and the subscriber C. At this time, it is confirmed (S311) that the subscriber C is a group subscriber, and it is determined by means of the above-mentioned hold data (*4) whether or not a subscriber is on hold, in the group data (S312). In the present example, the subscriber B who is on hold is confirmed and the subscriber data (subscriber number) is read.

Figure 13:
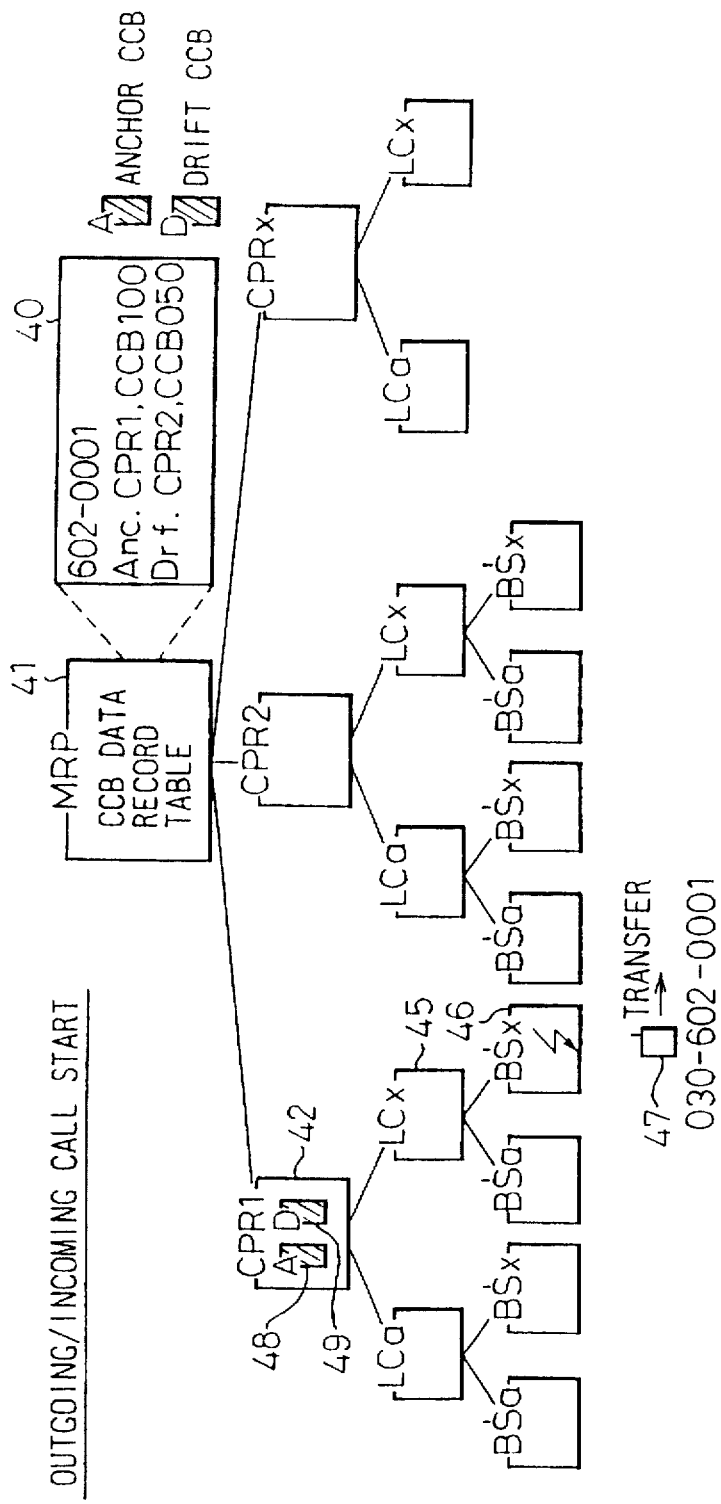
FIG. 13 is a block diagram showing one embodiment (1) of the mobile network exchange with a multi-processor construction, according to the present invention, in a diagrammatic form.
Figure 14:
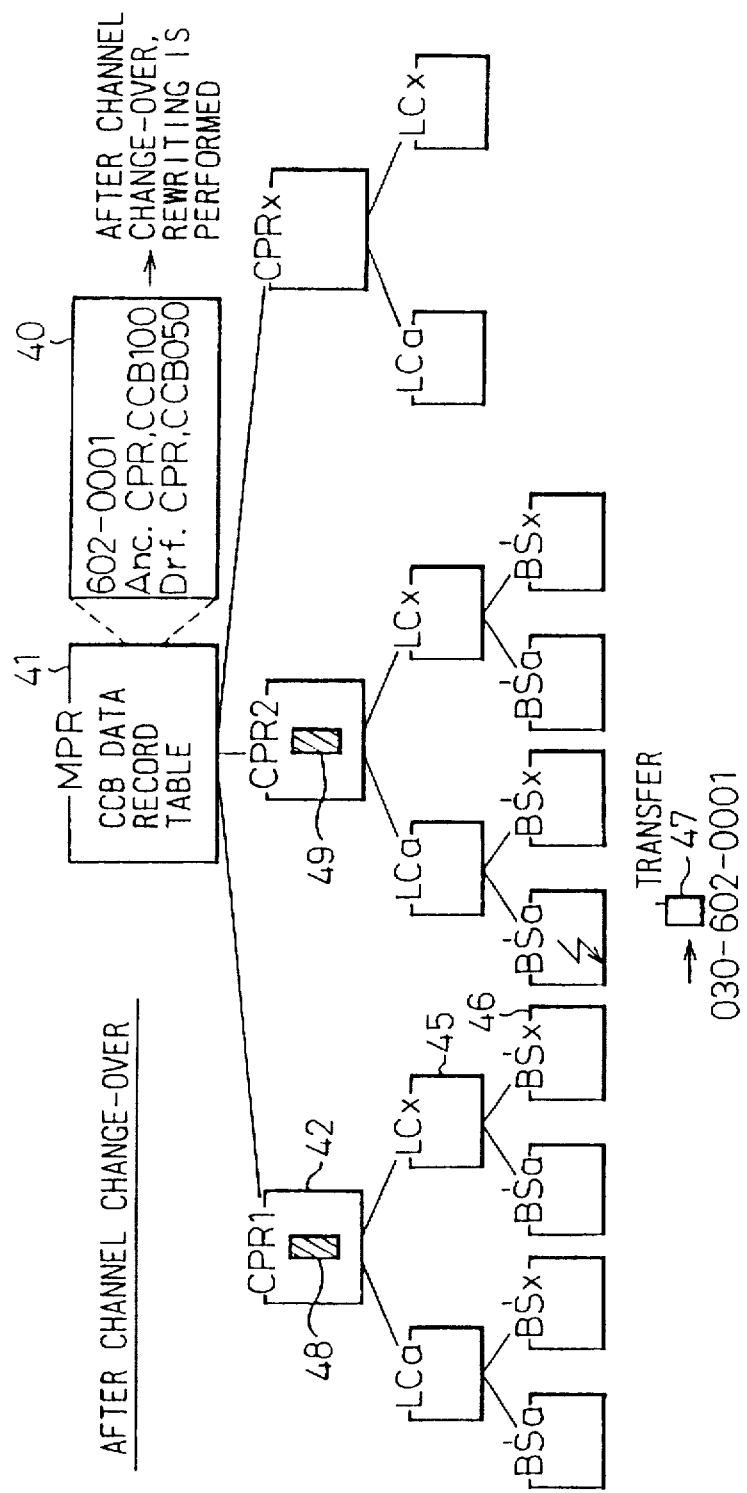
FIG. 14 is a block diagram showing one embodiment (2) of the mobile network exchange with a multi-processor construction, according to the present invention, in a diagrammatic form.

FIG. 13 and FIG. 14 are diagrams which show an embodiment of the mobile network exchange with a multi-processor configuration, as applied to the calling data search system of the present invention.

In FIG. 13 and FIG. 14 the multi-processor system comprises a plurality of call processors (CPR; Call Processor) 42 to 44, and a main processor (MPR; Main Processor) 41 which groups these together. A plurality of Base Stations (BS) and their Line Concentrators (LC) are each located under each of the call processors. The mobile terminal 47 is connected to one of the above-mentioned base stations in a prescribed area, using a prescribed wireless channel.

Incidentally, it is necessary for the change-over, for example, between the call group terminals, during a conversation, as described above, to be carried out rapidly. With the examples of FIG. 13 and FIG. 14, the mobile terminal 47 is located under the control processor (CPR1) 42 and therefore the anchor CCB 48 and the drift CCB 49 of the CCB (Call Control Block) by which the call data are written are also both under the control of the above-mentioned call processor 42. When, for example, change-over occurs subsequently between, for example, the call group terminals, during conversation, as described above, the above-mentioned mobile terminal 47 moves into the base station area of a different call processor (CPR 2) 43 as shown in FIG. 14, and in a case such as that in which the above-mentioned drift CCB 49 also moves into the call processor 43 it is necessary to search rapidly for the CCB which will be the object of subsequent processing.

Also, in such a case, a CALL number recording table 40 is provided in the main processor 41 according to the present invention, such that it is possible to search for the CCB of the called party quickly, without searching the CCBs of all the CPRs, as in the past. Here, the "CALL number" comprises a combination of the CPR number and the CCB number by which the subscriber is being controlled during telephone conversation. The main processor 41 can search for the CCB of the called party in a short time based on the recording table 40 of the above-mentioned CALL number. The basic constituent elements of the recording table 40 of the above-mentioned CALL number and their operation will now be described in detail.

Figure 15:
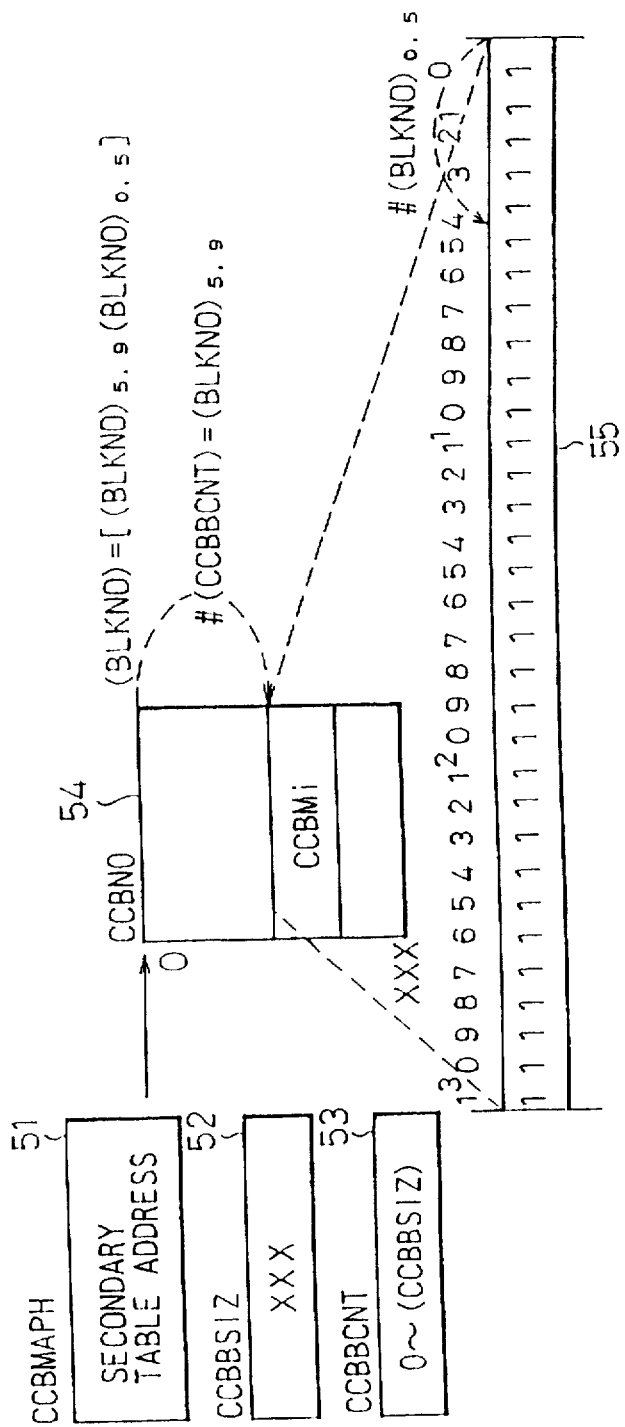
FIG. 15 is a functional diagram showing an example of a CCB idle flag map table.

FIG. 15 shows an example of a CCB idle flag map table. By means of this table a block number (BLKNO) for indexing the recorded CCB block table (CCBB) of the CALL number in use (=CPR number+CCB number) during an outgoing/incoming call is provided.

In FIG. 15, the CCB idle flag map table (CCBM) 54 is located from the head of the secondary table address indicated by the CCBMAPH (busy CCB data block idle flag MAP Head) table 51. Its value is linked to the recording block table described below, and is the station data, due to the necessity for the mounted quantity to be changeable depending on the exchange station. The word position and bit position of the idle flag hunted in the above-mentioned table 54 are a block number (BLKNO) for indexing the CCB block table (CCBB) in which the CALL number (=CPR number+CCB number) in use has been recorded.

The table size of the CCB block mounted in the exchange station is recorded in the CCBBSIZ (busy CCB data Block SIZe) table 52, and in this example has values from 0 to a maximum 511. The size of the above-mentioned CCB idle flag map table 54 can manage subscriber CCB data for a maximum of 16,000 subscribers, with the above-mentioned maximum value of 511 words, and with each word being 32 bits wide. The CCBBCNT (busy CCB data Block CouNTer) table 53 is the word index counter for the CCB idle flag map table 54, and is counted up from 0 to the value of CCBBSIZ.

According to the example of FIG. 15, the address given by CCBMAPH51 is set as the table address 0, and the position number (CCBBCNT) of the word (CCBMi) 55 counted up by only the value of CCBBCNT53 therefrom is the value $(BLKNO)_{3,9}$ of the 9 bits from bit 5 (bit 5 to bit 13) of the block number, and moreover in the above-mentioned word 55, the corresponding bit positions from the assigned idle flags (1; not in use, 0; in use) for each bit are the values $(BLKNO)_{0,5}$ of the 5 bits from bit 0 (bit 0 to bit 4) of the block number. Therefore, the value of the block number obtained is $(BLKNO)=[(BLKNO)_{5, 9}(BLKNO)_{0, 5}]$.

Figure 16:
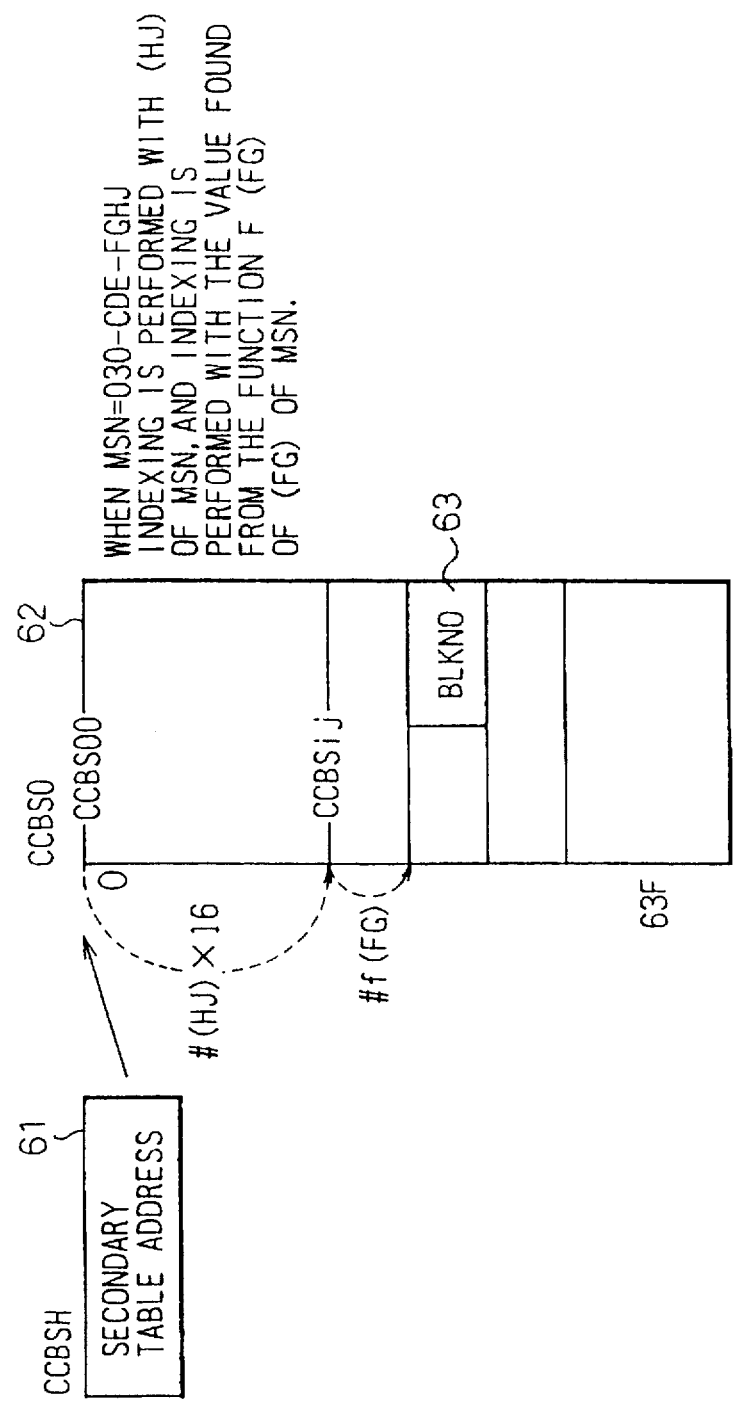
FIG. 16 is a functional diagram showing an example of a CCB search table.

FIG. 16 shows an example of a CCB search table for searching for the CCB block table in which the CALL number is recorded. The CCB search table (CCBS) 62 is indexed by the telephone number (MSN; Mobile Subscriber Number) of the called party, by means of which the above-mentioned block number (BLKNO) indexing the above-mentioned CCB block table (CCBB) is obtained.

In FIG. 16 the above-mentioned table 62 is located from the head of the secondary table address indicated by the CCBSH (busy CCB Search table Head) table 61. It should be noted that in the above-mentioned secondary table address the data dealt with by this table are related to the telephone numbers, and do not depend on station conditions such as the traffic load, and adopt fixed values as system data.

In the present invention a prescribed function (for example a hash function) is employed when the MSN, which is the key data for the above-mentioned index, is used, in order to reduce the amount of memory used in the table, and to perform search processing in a short time. The telephone number is generally of the type MSN=OAB–CDE–FGHJ, for example when f (FG)=(remainder (0 to 15) when FG is divided by 16) is used as the above-mentioned function, and the amount of memory mounted for the search table 62 which records the CALL number is 16/100 (e.g.; f (12)=12 when MSN=030–510–1234). FIG. 16 shows the table configuration using the above-mentioned function, and the indexing method, and the target block number (BLKNO) 63 is indexed by (HJ) of MSN, and moreover is requested by being indexed by the demanded value of the above-mentioned function f (FG) of (FG).

Figure 17:
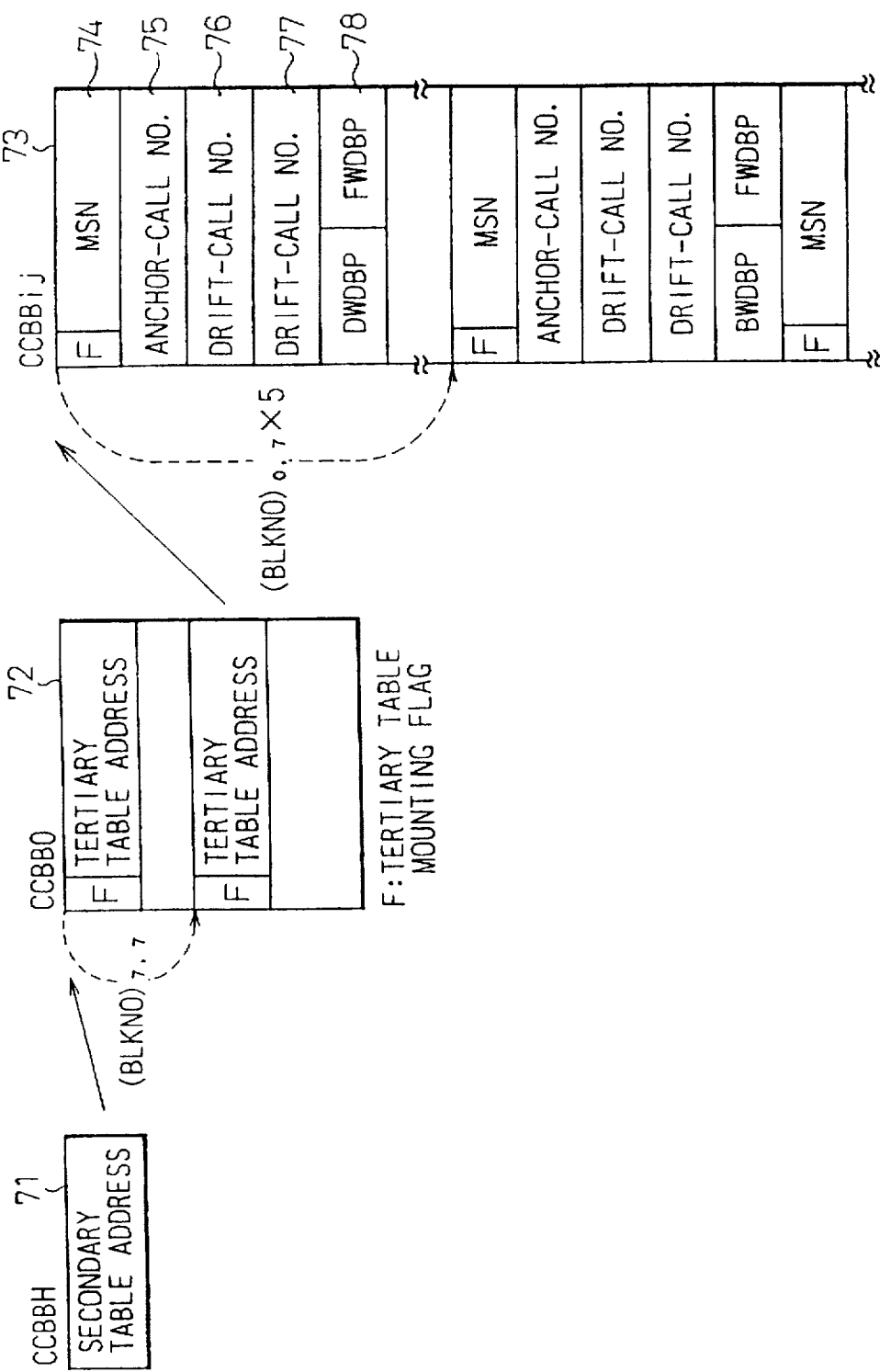
FIG. 17 is a functional diagram showing one example of a CCB block table.

FIG. 17 shows an example of a CCB block table in which the CALL number is recorded. The final search objective CALL number is written in the CCB block table (CCBB) 73, and indexing is performed using the block number (BLKNO) obtained from the above-mentioned CCB search table 62, as the key.

In FIG. 17 the above-mentioned table 73 is positioned from the head of the address indicated by the secondary and tertiary table addresses indicated by the CCBBH (busy CCB data Block Head) table 71 and the CCBB0 table 72. The above-mentioned secondary and plurality of tertiary table addresses are station data, and the above-mentioned tertiary table address is indicated by using the values $(BLKNO)_{7, 7}$ of the 7 bits (bit 7 to bit 13) from bit 7 of the above-mentioned block number, and is arranged such that the amount of memory which is mounted can be flexibly altered in accordance with station conditions such as traffic. It should be noted that a flag (F) which indicates valid/invalid is provided for this purpose in each of the tertiary table addresses in the tertiary table 72.

128 different CCBs are indicated using the values $(BLKNO)_{0, 7}$ of the 7 bits (bit 0 to bit 6) form bit 0 of the above-mentioned block number, from the head address of the CCB block table 73 indicated by one of the above-mentioned tertiary table addresses. It should be noted that actual addressing is performed by $(BLKNO)_{5, 7} \times 5$, since each CCB comprises 5 words. As shown in FIG. 17 each CCB comprises the telephone number (MSN) of the subscriber using the CCB, and the flag (F) 74 indicating its validity or invalidity, the anchor CALL number 75, the drift CALL number 76, the drift CALL number 77 during channel change-over, and a pointer for setting up a link to the CCB indicated by the BLKNO which has already previously been hunted, when the index points found using the function value described above overlap, when the CCBS table is indexed by MSN (for example $f(FG)=f(16)=f(32)=0$).

Explanations will now be given concerning the specific processes described above, under the headings (1) CCB data recording process, (2) CCB data cancelling process and (3) CCB search process.

(1) CCB data recording process

FIG. 18 to FIG. 23 show specific examples of the data recording process. It should be noted that the same references are used as in the embodiments described above for identical items, and their description hereafter is omitted. In order to explain the above-mentioned process a specific description concerning the processes when a subscriber whose subscriber number MSN=030–510–1600 makes and receives a call, is given below.

Figure 18:
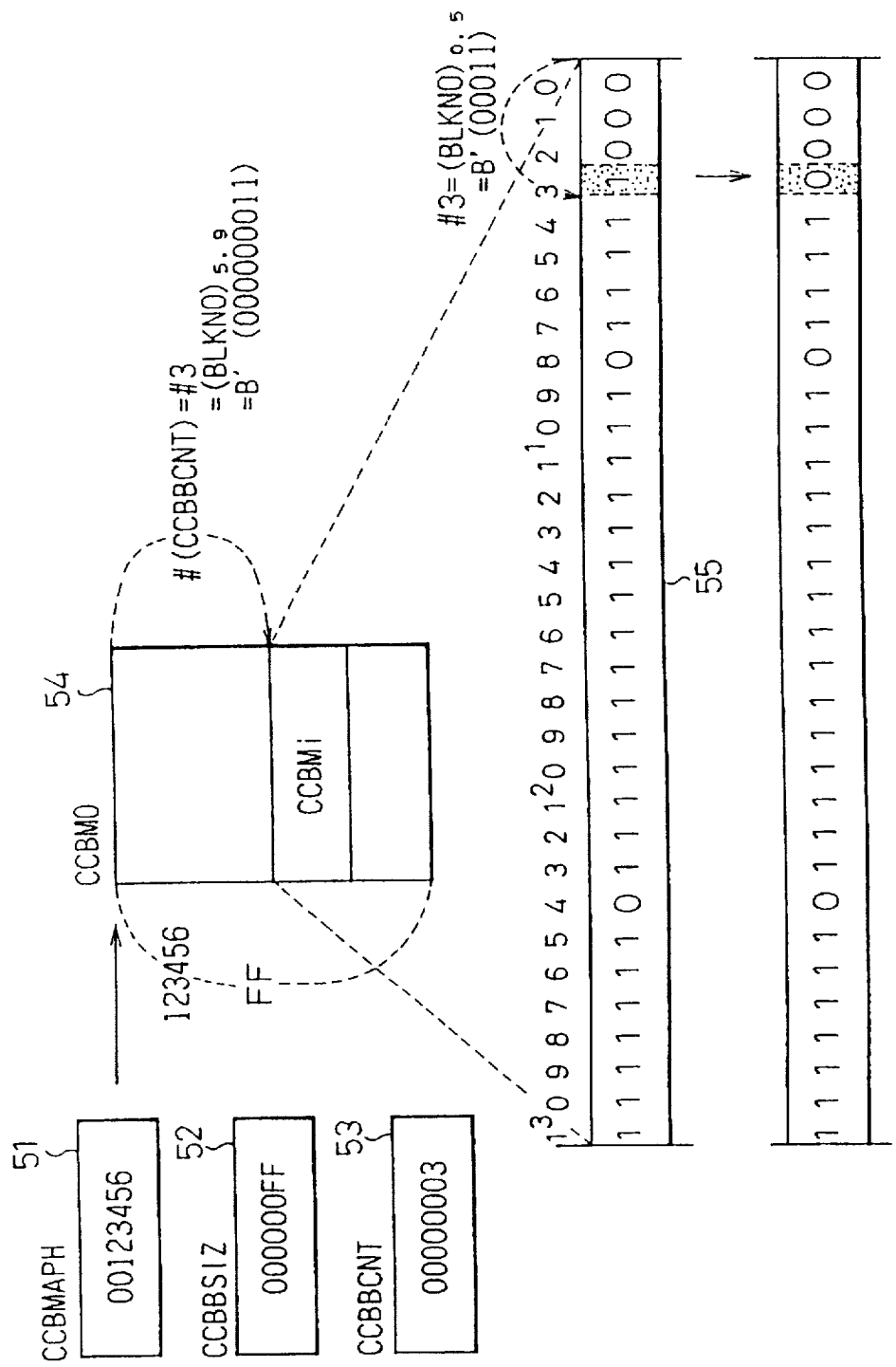
FIG. 18 is a functional diagram showing an example of a CCB data recording process (1).

FIG. 18 relates to the CCB idle flag map table 54 described in FIG. 15, and this recording process occurs when the CCB is searched, as a result of a call made or received by the subscriber.

In order to provide a prescribed block number (BLKNO) to the CCB which is being searched, the idle flag word position in the CCB idle flag map table 54 which starts from the position (00123456) addressed by the CCBMAPH51 is first determined. To this end, the value 3 of the block counter CCBBCNT53 is read, and this is set as the values of the 9 bits from bit 5 of the block number $(BLKNO)_{5, 9}$=B' (000000011). Here, xx in B' (xx) indicates a binary value. It should be noted that the table size is 256 words from CCBBSIZ52 (=FF).

The idle flag in the above-mentioned determined word is then searched (in FIG. 18 it is searched from the LSB side.), and when an unused bit (flag =1) is found, the values of the 5 bits from bit 0 of the block number are determined from this bit position $(BLKNO)_{0, 5}$=B' (00011), and the above-mentioned bit is rewritten as "in use" (flag=0). From the above process, the value of the block number with respect to the hunted CCB is provided as (BLKNO)=B' (00000001100011)=H' (63). Here, the xx of H' (xx) indicates a Hex value. It should be noted that the block counter CCBBCNT53 is incremented each time each of the processes described above is completed, in order to carry out the above-mentioned idle flag processing in the map uniformly, and cycles within the scope of the values of the above-mentioned CCBBSIZ52.

Figure 19:
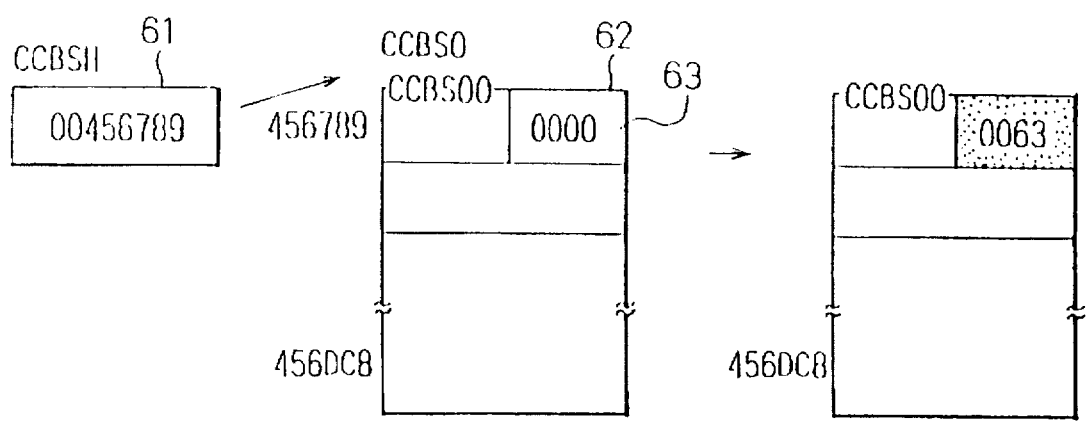
FIG. 19 is a functional diagram showing an example of a CCB data recording process (2).

FIG. 19 relates to the CCB search table 62 described in FIG. 16, and here the block number obtained as described above is written at the table position indexed by the subscriber number MSN.

Using the start position (00456789) of the CCB search table 62 addressed by CCBSH61, the block number write address is requested by indexing with the subscriber number MSN=030–510–1600. To elaborate, since FGHJ of the telephone number are 1600, H' (HJ)=H' (00)×16=0, and moreover the function described above is f (FG)=f (16)=0, and the index point is zero. Here, as shown in the central portion of FIG. 19, the block number write area 63 is empty (0000), and the block number H' (63) described above is written therein.

Figure 20:
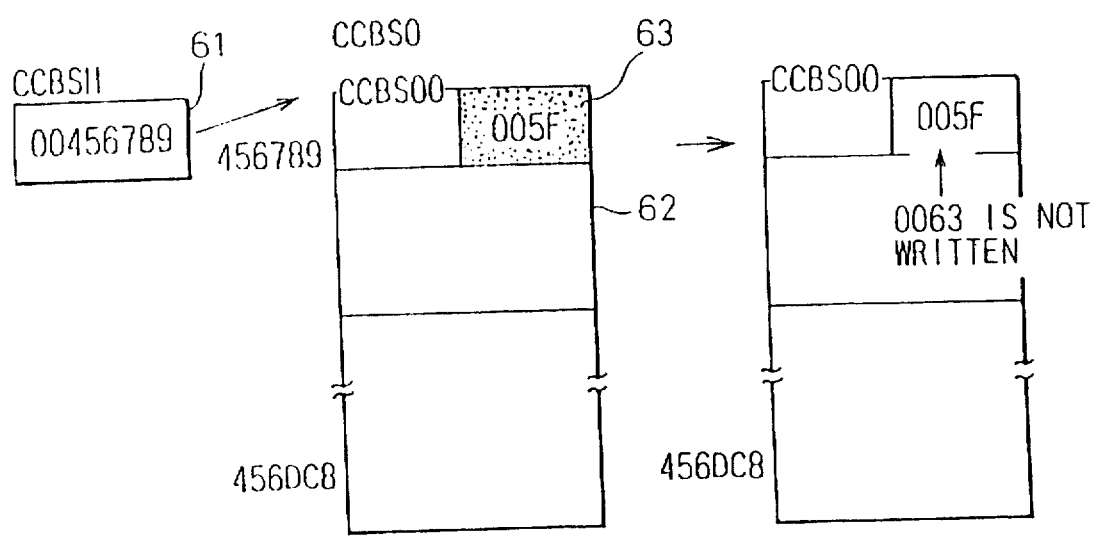
FIG. 20 is a functional diagram showing an example of a CCB data recording process (3).

FIG. 20 shows the case in which a block number H' (5F) is already written in the block number write area 63, as shown in the central portion, as opposed to the case in the above-mentioned FIG. 19. Such an event occurs because, as described with regard to the pointer 78 in FIG. 17, it sometimes happens that indicated index points overlap, depending on the MSN number, as a result of using the above-mentioned function when the CCBS table is indexed by the MSN. For example, for different telephone numbers MSN=030–510–1600, MSN=030–510–3200, the function values of the above-mentioned index have the same values, f (FG)=f (16)=f (32)=0, and since for both telephone numbers HJ=00, the index point will be the same. In such a case, the block number is not rewritten, as shown in the diagram on the right hand side. Processing in this case occurs as described in FIG. 22 below.

Figure 21:
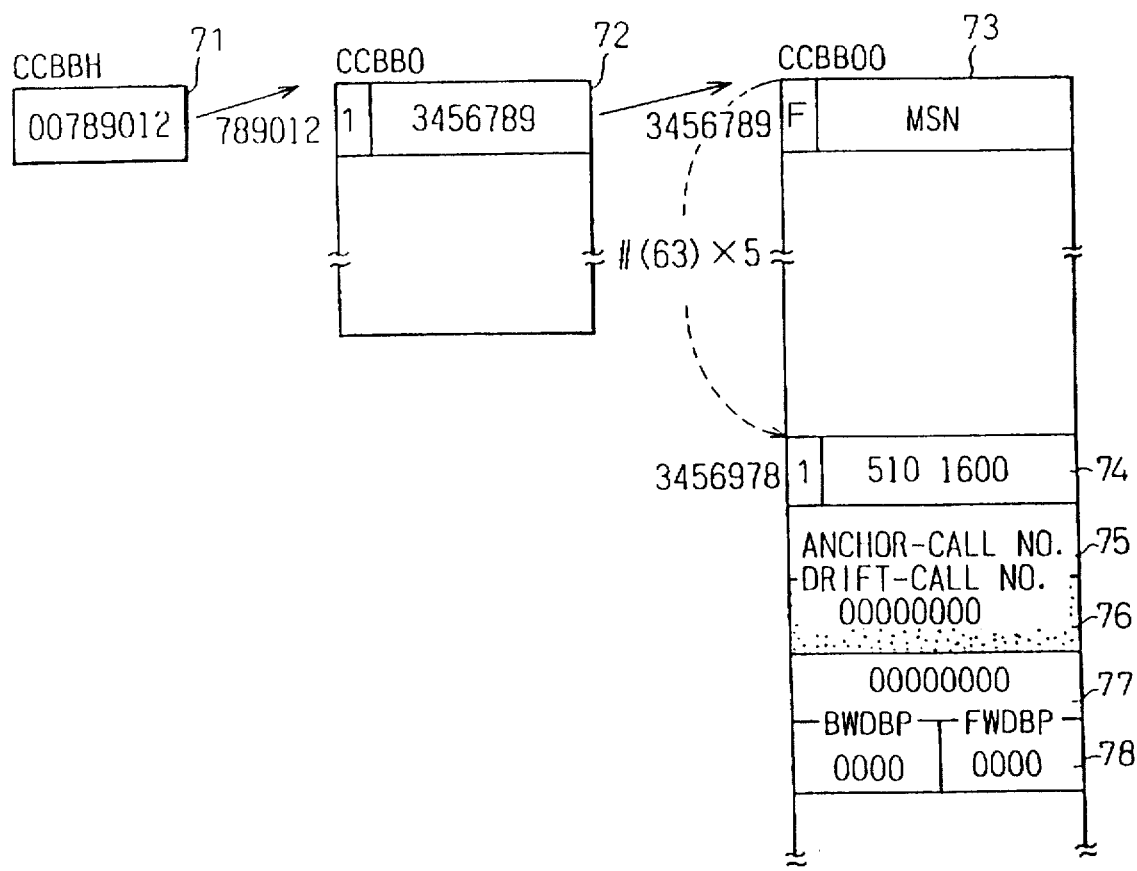
FIG. 21 is a functional diagram showing an example of a CCB data recording process (4).

FIG. 21 refers to the CCB block table 73 described in FIG. 17, and here is displayed the process for writing the CALL number, for example, in a prescribed CCB in the CCB block table 73, by indexing with the block number searched from the telephone number MSN described above. From the searched block number BLKNO=H' (63)=B' (00000001100011), the secondary table (CCBB0) 72 is first indexed by $(BLKNO)_{7, 7}$=B' (0000000)=0, and the head address of the CCB block table 73, which is the object, is obtained from the address (3456789) written therein. The tertiary table (CCBB00) 73 is then indexed by the remaining block number $(BLKNO)_{0, 7}$×5=B' (1100011)×5=H' (1EF), and the CALL number, for example, (MSM–pointer 74 to 78) is written therein. It should be noted that, for the writing of the drift CALL number 76, the recording process is started by the MPR when the CCB is searched on the drift side.

Figure 22:
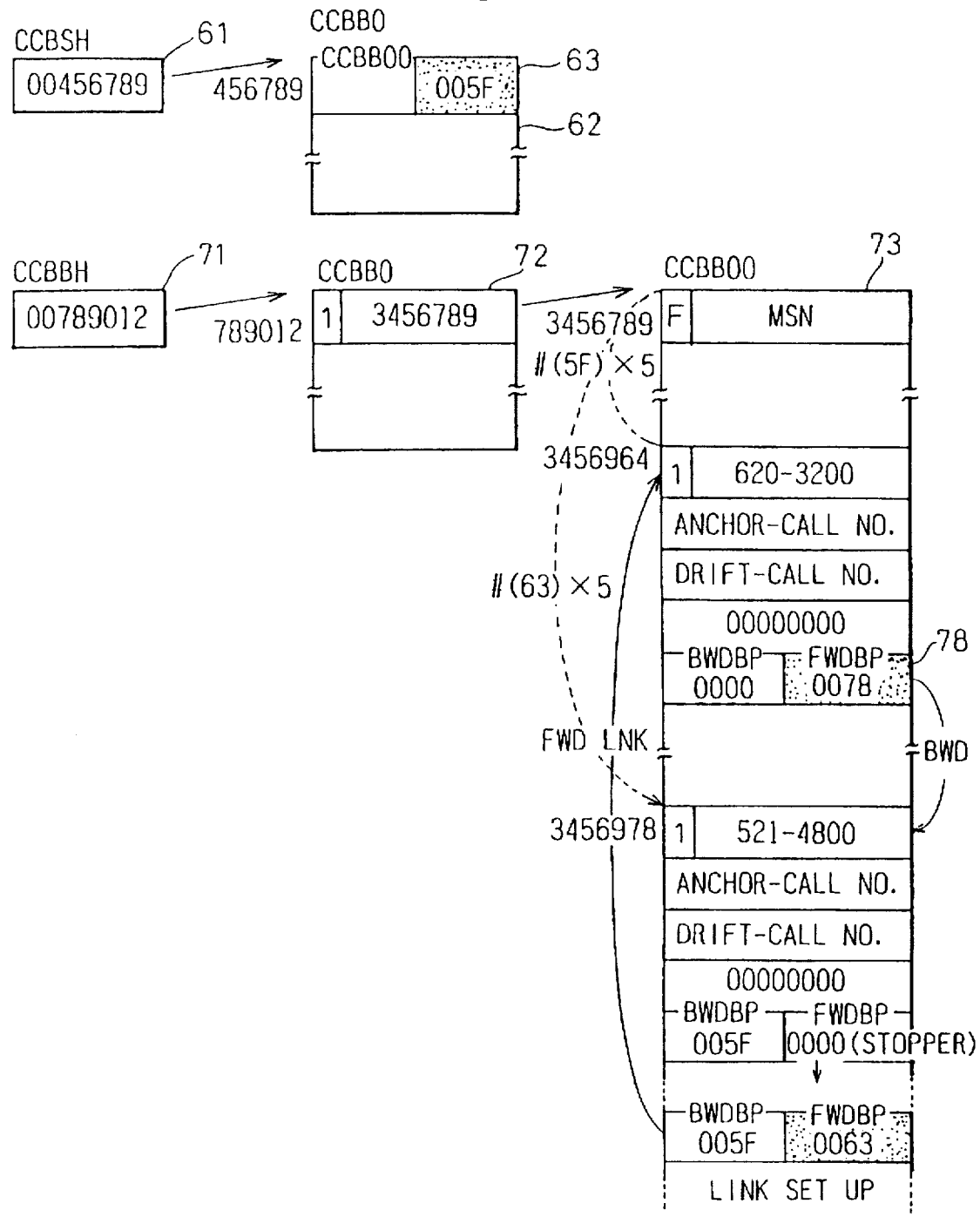
FIG. 22 is a functional diagram showing an example of a CCB data recording process (5).

FIG. 22 shows the processing in the case in which a block number is already written, as in the case in FIG. 20.

As shown in the upper diagram of FIG. 22, in the case in which the block number H' (5F) which has already been searched, as been written, a link is formed between the previously searched block and the following block, using a forward block pointer (FWDBP) and a backward block pointer (BWDBP) 78 in each of the CCBs.

In the example of FIG. 22, the secondary table (CCBB0) 72 is first indexed from (BLKNO)=H' (5F)=B' (00000001011111), by $(BLKNO)_{7, 7}$=B' (0000000)=0, the head address of the CCB block table 73 which is the object is obtained from the address written therein (3456789), then the tertiary table (CCBB00) 73 is indexed by the remaining block number $(BLKNO)_{0, 7}$×5=B' (1011111)×5=H' (5F)×5, and the block table which was searched in advance is searched therein.

Then, by looking for the forward block pointer, it is determined whether a forward link has been set up, or whether or not it is a stopper H' (0000) indicating the end of the link, and if a link has been set up, then this link is followed. The example of FIG. 22 shows a case in which the block table H' (005F) already has a link set up at the second level to another block table H' (0078). Therefore, in this case, the forward block pointer of the block table H' (0078) is re-examined using the value H' (0078) of the forward block pointer of the block table H' (005F), by re-indexing with H' (0078)×5. Then, when it is confirmed that it is a stopper H' (0000), its contents are renewed to H' (0063) linking with the block table H' (0063), and finally the data are written into the block table of the block number H' (0063).

Figure 23:
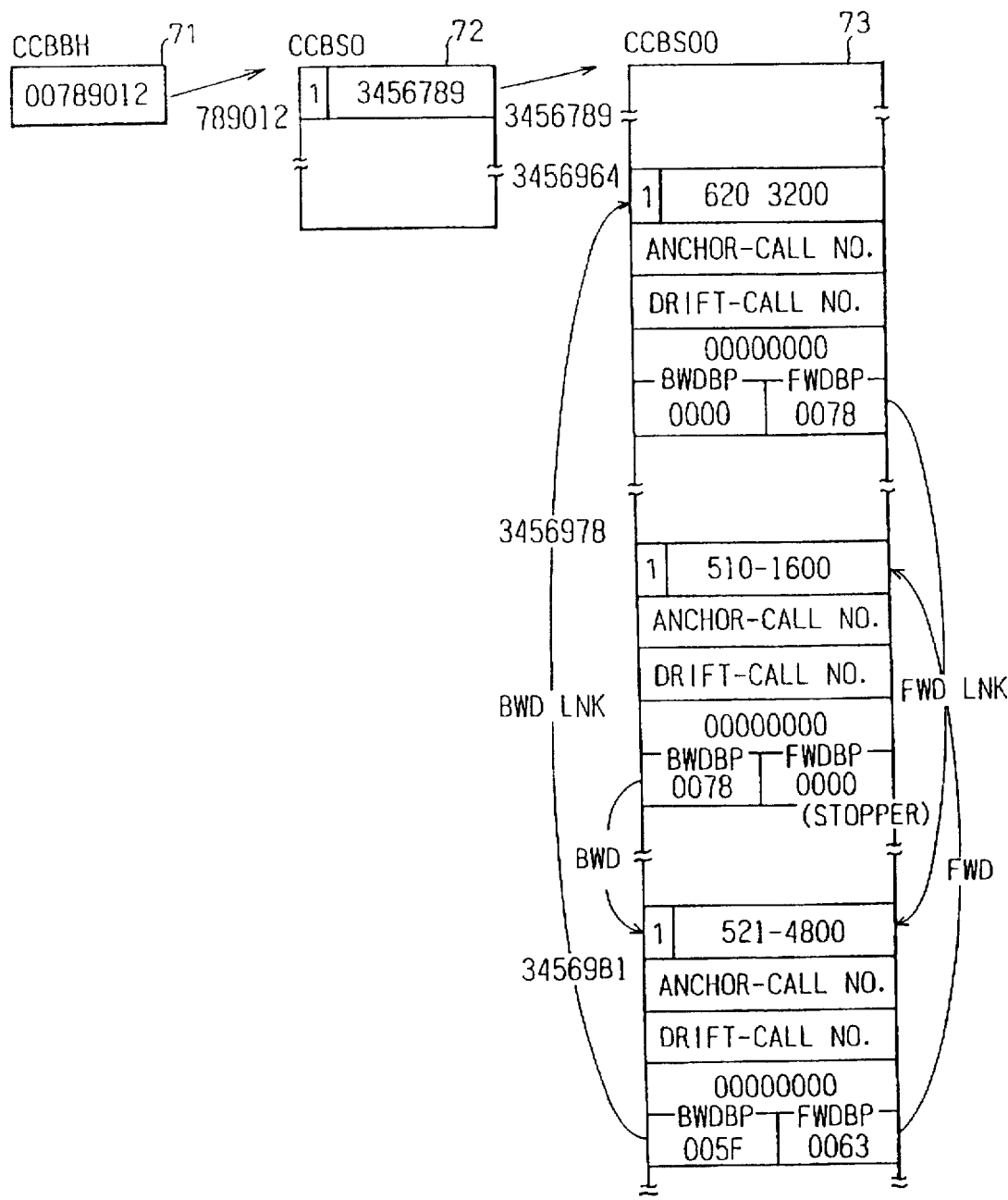
FIG. 23 is a functional diagram showing an example of a CCB data recording process (6).

FIG. 23 shows the final block table obtained by means of the above-mentioned link process. It should be noted that a stopper H' (0000) indicating the end of the link is written in the forward block pointer of the final stage block table H' (0063). Also, although not described above, the block number of the previous stage of each block link is written in the backward block pointers (BWDBP), as, for example, with (BWDBP) H' (0078) in the case of the block table H' (0063).

(2) CCB data cancelling process

Figure 24:
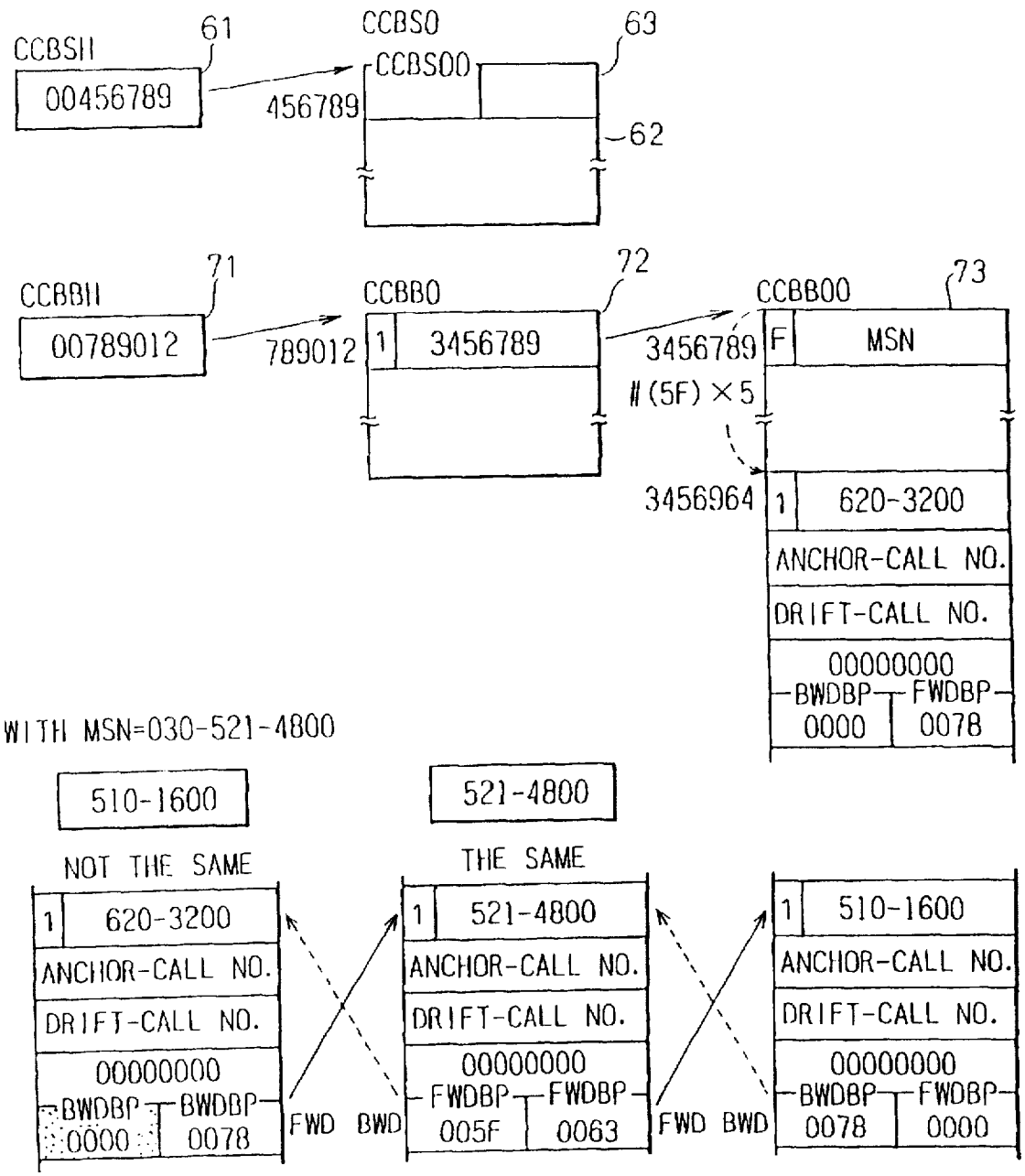
FIG. 24 is a functional diagram showing an example of a CCB data erasing process (1).

In relation to FIG. 24 an explanation is given concerning the CCB data cancelling process using the example of the CCB data recording process described above. It should be noted that the same references are used as in the embodiment described above for identical items, and their explanation is not given again here.

When a subscriber completes a call, the cancellation process of the CCB data (CALL number, etc.) recorded in the block table, is begun. An explanation will be given here concerning the case in which the call of the subscriber whose telephone number MSN=030–521–4800 shown in FIG. 22 and FIG. 23 is completed.

When the call processors (CPR) 42 to 44 are notified by the main processor (MPR) 41 (see FIGS. 13 and 14) that the MSN=030–521–4800 call has been completed, the main processor 41 extracts the block number 63 from the search table 62 by using the recording table 40, indexed by the above-mentioned MSN. In other words, the block number H' (005F) of the "0"th word of the CCBS00 is extracted, since HJ=00, f (FG)=(48)=0. Next, when indexed by the above-mentioned block number H' (005F), the block table 73 is linked as in the diagram on the right, as described in FIG. 23. Here, as shown in the lower stage of FIG. 24, the call is compared with the above-mentioned MSN which is completed and with the MSNs linked in the block table, following the above-mentioned links. The block in which the above-mentioned MSN is identical is the block to be cancelled, and thus the block number to be opened is known to be H1 (0078).

FIG. 25 shows the method of cancelling the links of the central block which is the object of cancellation, shown at the bottom of FIG. 24. This is performed by removing the links, both the forward link and the backward link, of the above-mentioned central block, and by setting up a new link between the other blocks. The actual link change-over is performed by writing the value H' (0063) of the forward block pointer (FWDBP) and the value H' (005F) of the backward block pointer (BWDBP) of the cancelled block in the corresponding FWDBP and BWDBP of the other block to which the cancelled block was linked. It should be noted that the opened block table (CCBB78) is initialized (zero clear).

FIG. 26 shows the process for returning the corresponding bit in the CCB idle flag map table 54 to the idle state (flag=1), after cancellation of the above-mentioned CCB data.

The corresponding flag position is known, using the reverse sequence to FIG. 15, from the block number H' (0078) of the block table which was the object of the above-mentioned cancellation. In other words, since the value of the block number is (BLKNO)=H' (78)=B' (00000001111000), the word address in the map table 54 is $(BLKNO)_{5, 9}$=B' (000000011)=3, as described above, and the bit position in the word is $(BLKNO)_{0, 5}$=B' (11000)=24, and the corresponding flag position is requested. Finally, the above-mentioned requested flag bit is rewritten as 1, and returned to the idle state.

(3) CCB search processing

Finally, an explanation is given concerning the search process with the MSN of the subscriber as the key, in the case in which, for example, a subscriber receives an incoming call during a conversation, or in which the operator enters an appropriate command. It should be noted that the search itself has been described in detail in connection with other processes, so it will be described here simply.

Firstly, the CCB search table is searched by indexing using the telephone number MSN of the subscriber who was the object of the search. At this time, the speed of the search and the amount of memory are reduced by using a function such as that described above. Next, the block table in the CCB block table is searched by indexing by means of the block number (BLKNO) obtained by means of the above-mentioned search. Here, the MSN in the block table which has been searched, mentioned above, is compared with the MSN which is the object of the above-mentioned search, and when they are the same, the CPR number and the CCB number in the block table are requested. If they are not the same, a block table which is the same is searched for by following a link in the block table, and the CPR number and the CCB number in the block are searched for.

As described above, according to the present invention, it is possible, in the present day in which fixed terminals are in common use and mobile terminals are becoming widespread, to reduce call losses due to redialing or terminal change-over of telephones between fixed terminals and mobile terminals, and to achieve an improvement in telephone services, by unifying and communizing the database between fixed terminals and mobile terminals, and by implementing a group service which has group data in the database and which comprises fixed terminals and mobile terminals.

Also, according to the present invention, by providing a table in which are recorded the CCB number and the call processor (CPR) number in use in the main processor (MPR), in a mobile network exchange with a multi-processor configuration, improvements in the properties are achieved, for example, a reduction in the connection processing time to a mobile network subscriber having the additional services, including, for example, the processors described above, and a reduction in the operator processing time.

We claim:

1. Terminal calling system in a composite communications network including mobile terminals and fixed terminals comprising:

a mobile network exchange which controls connection with mobile terminals, a fixed network exchange which controls connections with fixed terminals, and a database which is accessed in common by said mobile network exchange and said fixed network exchange, said database recording data about groups comprising a combination of said mobile terminals and said fixed terminals, said mobile network exchange and said fixed network exchange uniformly calling all or some of the terminals within one group of said groups comprising a combination of said mobile terminals and said fixed terminals, in accordance with the group data of said database, all of said called terminals being uniformly called prior to call completion with any of said called terminals, wherein a group comprising a combination of mobile terminals and fixed terminals, which is recorded in said database, comprises group telephones, said group telephones include group representative subscriber telephones which can receive group call services when the subscriber receives an incoming call, and group elementary subscriber telephones which can receive group calls but cannot receive group call services with respect to incoming calls received personally, and access the group data recorded in said database by means of the telephone numbers of said group representative subscribers.

2. Terminal calling system in an integrated exchange network, which uniformly controls mobile terminals and fixed terminals, comprising:

a composite network exchange which controls connections with both mobile terminals and fixed terminals, and a database which is accessed by said integrated network exchange, said database recording data about groups comprising a combination of said mobile terminals and said fixed terminals, said integrated network exchange uniformly calling all or some of the terminals within one group of said groups comprising a combination of said mobile terminals and said fixed terminals, in accordance with the group data of said database, all of said calling terminals being uniformly called prior to call completion with any of said called terminals, the group comprising a combination of mobile terminals and fixed terminals, which are recorded in said database, comprises group telephones, said group telephones include group representative subscriber telephones which can receive group call services when the subscriber receives an incoming call, and group elementary subscriber telephones which can receive group calls but which cannot receive group call services with respect to incoming calls made personally, and access the group data recorded in said database by means of the telephone numbers of said group representative subscribers.

3. The terminal calling system as claimed in claim 1, wherein said mobile network exchange and said fixed network exchange stop calling to the other terminals in said group comprising a combination of said mobile terminals and said fixed terminals, in accordance with the group data in said database, when one of said called group terminals is answered.

4. The terminal calling system as claimed in claim 2, wherein said integrated network exchange stops calling to the other terminals in said group comprising a combination of said mobile terminals and said fixed terminals, in accordance with the group data of said database, when one of said called group terminals is answered.

5. The terminal calling system as claimed in claim 1, wherein said mobile network exchange and said fixed network exchange have, as subscriber data, common group telephone numbers in the mobile terminals and fixed terminals comprising said groups, and access the group data recorded in said database by means of said group telephone numbers.

6. The terminal calling system as claimed in claim 2, wherein said integrated network exchange has, as subscriber data, common group telephone numbers in the mobile terminals and the fixed terminals comprising said group, and accesses the group data recorded in said database by means of said group telephone numbers.

7. Terminal change-over system in a composite communications network including mobile terminals and fixed terminals, comprising:

a mobile network exchange which controls connections with mobile terminals, a fixed network exchange which controls connections with fixed terminals, and a database which is accessed in common by said mobile network exchange and said fixed network exchange, said database records data about groups comprising a combination of said mobile terminals and said fixed terminals which are the object of a mutual change-over, said mobile network exchange and said fixed network exchange change over and connect the mobile terminals or the fixed terminals, during a telephone conversation, to the fixed terminals or the mobile terminals comprising said combination, in accordance with the group data of the mobile terminals and the fixed terminals in said database, without interrupting said telephone conversation.

8. A terminal change-over system in an integrated exchange network which uniformly controls mobile terminals and fixed terminals, comprising:

an integrated network exchange which controls connections with both mobile terminals and fixed terminals, and a database which is accessed by said integrated network exchange, said database records data about groups comprising a combination of said mobile terminals and said fixed terminals which are the object of a mutual change-over, said integrated network changes over and connects the mobile terminals or fixed terminals, during telephone conversation, to the fixed terminals or the mobile terminals comprising said combination, in accordance with the group data of the mobile terminals and fixed terminals in said database, without interrupting said telephone conversation.

9. The terminal change-over system as claimed in claim 7, wherein said mobile network exchange and said fixed network exchange notify of a call-hold in said group to said database when a subscriber of said group holds a call, access said database and search for the held call in said group when a subscriber in said group performs reply processing of the held call, and change over and connect said call, which is on hold, inside the group, from the subscriber number of the subscriber who is on hold, obtained by means of said search, to said hold reply call.

10. Terminal change-over system as claimed in claim 8, wherein said integrated network exchange notifies said database of a call-hold in said group to said database when a subscriber of said group holds a call, accesses said database and searches for the held call in said group when a subscriber in said group performs reply processing of the held call, and changes over and connects said call, which is on hold, inside the group, from the subscriber number of the subscriber who is on hold, obtained by means of said search, to said hold reply call.

11. Terminal calling system in a composite communications network including mobile terminals and fixed terminals, comprising:

a mobile network exchange which controls connections with mobile terminals, a fixed network exchange which controls connections with fixed terminals, and a database which is accessed in common by said mobile network exchange and said fixed network exchange, said database recording data about groups comprising a combination of said mobile terminals and said fixed terminals, at least one of said groups including group telephones, said mobile network exchange and said fixed network exchange calling all or some of the terminals of a group comprising a combination of said mobile terminals and said fixed terminals in accordance with the group data of said database, said group telephones including group representative subscriber telephones which can receive group call services when a subscriber receives an incoming call, and group elementary subscriber telephones which can receive group calls but cannot receive group call services with respect to incoming calls received personally, and access the group data recorded in said database by means of the telephone numbers of said group representative subscribers.

12. Terminal calling system in an integrated exchange network, which uniformly controls mobile terminals and fixed terminals, comprising:

a composite network exchange which controls connections with both mobile terminals and fixed terminals; and a database, which is accessed by said integrated network exchange, said database recording data about groups comprising a combination of said mobile terminals and said fixed terminals, at least one of said groups including group telephones, said integrated network exchange calling all or some of the terminals of a group comprising a combination of said mobile terminals and said fixed terminals, in accordance with the group data of said database, said group telephones including group representative subscriber telephones, which can receive group call services when a subscriber receives an incoming call, and group elementary subscriber telephones which can receive group calls but which cannot receive group call services with respect to incoming calls made personally, and access the group data recorded in said database by means of the telephone numbers of said group representative subscribers.

* * * * *